(12) United States Patent
Liu

(10) Patent No.: US 12,400,081 B2
(45) Date of Patent: Aug. 26, 2025

(54) NAMED ENTITY RECOGNITION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 291 days.

(21) Appl. No.: 17/947,548

(22) Filed: Sep. 19, 2022

(65) Prior Publication Data

US 2023/0015606 A1 Jan. 19, 2023

Related U.S. Application Data

(63) Continuation of application No. PCT/CN2021/116228, filed on Sep. 2, 2021.

(30) Foreign Application Priority Data

Oct. 14, 2020 (CN) .......................... 202011096598.0

(51) Int. Cl.
*G06F 40/295* (2020.01)
*G06F 40/30* (2020.01)

(52) U.S. Cl.
CPC ............ *G06F 40/295* (2020.01); *G06F 40/30* (2020.01)

(58) Field of Classification Search
None
See application file for complete search history.

(56) References Cited

U.S. PATENT DOCUMENTS 11,507,748 B2 * 11/2022 Gao ...................... G06F 40/205
2021/0056445 A1 * 2/2021 Wu ....................... G06F 40/295
(Continued)

FOREIGN PATENT DOCUMENTS

CN 106503056 A 3/2017
CN 107644014 A * 1/2018
(Continued)

OTHER PUBLICATIONS

L. Xue, H. Cao, F. Ye and Y. Qin, "A Method of Chinese Tourism Named Entity Recognition Based on BBLC Model, " 2019 IEEE SmartWorld, Ubiquitous Intelligence & Computing, Advanced & Trusted Computing, Scalable Computing & Communications, Cloud & Big Data Computing (Year: 2020).*
(Continued)

*Primary Examiner* — Andrew C Flanders
*Assistant Examiner* — Theodore Withey
(74) *Attorney, Agent, or Firm* — ANOVA LAW GROUP PLLC

(57) ABSTRACT

A named entity recognition (NER) method includes: acquiring target text information; inputting the target text information into an input representation layer in a target recognition model to generate a target vector sequence; inputting the target vector sequence into a semantic representation layer to obtain a tag prediction sequence; and inputting the
(Continued)

tag prediction sequence into a condition discrimination layer to determine target items in a set of attribution probabilities.

15 Claims, 15 Drawing Sheets

(56) References Cited

U.S. PATENT DOCUMENTS

| | | | | |
|---|---|---|---|---|
| 2021/0149993 A1* | 5/2021 | Torres | ................... | G06N 3/045 |
| 2021/0326751 A1* | 10/2021 | Liu | ....................... | G06N 3/084 |
| 2021/0374347 A1* | 12/2021 | Yang | ..................... | G06F 40/295 |
| 2022/0012633 A1* | 1/2022 | Molahalli | ............... | H04L 41/50 |
| 2022/0172269 A1* | 6/2022 | Shan | .................. | G06Q 30/0201 |

FOREIGN PATENT DOCUMENTS

| | | |
|---|---|---|
| CN | 110298042 A | 10/2019 |
| CN | 111125331 A | 5/2020 |
| CN | 111191453 A | 5/2020 |
| CN | 111444720 A | 7/2020 |
| CN | 111444726 A | 7/2020 |
| CN | 111695345 A | 9/2020 |
| CN | 111753545 A * | 10/2020 |
| WO | 2020193966 A1 | 10/2020 |

OTHER PUBLICATIONS

Asgari-Chenaghlu, M., Feizi-Derakhshi, M.R., Farzinvash, L et al. CWI: A multimodal deep learning approach for named entity recognition from social media using character, word and image features. Neural Comput & Applic 34, 1905-1922 (2022) (Year: 2019).*

Guo, Zhaochen, and Denilson Barbosa. "Robust entity linking via random walks." Proceedings of the 23rd ACM International Conference on Conference on Information and Knowledge Management. 2014. (Year: 2014).*

Grütze, Toni, et al. "CohEEL: Coherent and efficient named entity linking through random walks." Journal of Web Semantics 37 (2016): 75-89. (Year: 2016).*

The State Intellectual Property Office of the People's Republic of China (SIPO) Office Action 1 for 202011096598.0 Jan. 6, 2024 11 Pages (including translation).

The World Intellectual Property Organization (WIPO) International Search Report for PCT/CN2021/116228 Nov. 25, 2021 8 Pages (including translation).

* cited by examiner

NAMED ENTITY RECOGNITION METHOD AND APPARATUS, DEVICE, AND STORAGE MEDIUM

RELATED APPLICATION(S)

This application is a continuation application of PCT Patent Application No. PCT/CN2021/116228 filed on Sep. 2, 2021, which claims priority to Chinese Patent Application No. 202011096598.0, filed with the China National Intellectual Property Administration on Oct. 14, 2020 and entitled "NAMED ENTITY RECOGNITION METHOD AND APPARATUS, DEVICE, AND STORAGE MEDIUM", all of which are incorporated herein by reference in entirety.

FIELD OF THE TECHNOLOGY

The present disclosure relates to the technical field of computers, and in particular, to named entity recognition (NER).

BACKGROUND

NER is a task in natural language processing (NLP), with a wide range of applications. Taking an entity as an example, the entity generally refers to an entity with a meaning or referentiality in text, which generally includes a person name, a place name, an organization name, date and time, a proper noun, or the like. By extracting the above entities from unstructured input text, more categories of entities can be recognized according to service items, such as a product name, a model, and a price. Therefore, the concept of entity may be broad. A text fragment desired by a service may be called an entity. Desired data or objects can be extracted by NER. NER is a basis for subsequent content mining analysis, relation extraction, and event analysis.

During the NER, an Aho-Corasick (AC) algorithm may be adopted to find internal rules of pattern strings to achieve efficient jump at each mismatch. For example, NER may be performed on identical prefix relations between the pattern strings.

SUMMARY

In view of the above, the present disclosure provides an NER method, which can effectively improve efficiency and accuracy of NER.

In one aspect, the present disclosure provides an NER method, applied to a system or program including an NER function in a terminal device, the method includes: acquiring target text information; inputting the target text information into an input representation layer in a target recognition model to generate a target vector sequence, the target vector sequence including a plurality of subvectors, the plurality of subvectors being obtained by representing the target text information based on at least two text dimensions; inputting the target vector sequence into a semantic representation layer in the target recognition model to obtain a tag prediction sequence, the tag prediction sequence being a set of attribution probabilities of the plurality of subvectors and a plurality of entity tags respectively, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and inputting the tag prediction sequence into a condition discrimination layer in the target recognition model to determine target items in the set of attribution probabilities, the target items being used for indicating the entities in the target text information.

In another aspect, the present disclosure provides an NER apparatus, the apparatus includes: a memory storing computer program instructions; and a processor coupled to the memory and configured to execute the computer program instructions and perform: acquiring target text information; inputting the target text information into an input representation layer in a target recognition model to generate a target vector sequence, the target vector sequence including a plurality of subvectors, the plurality of subvectors being obtained by representing the target text information based on at least two text dimensions; inputting the target vector sequence into a semantic representation layer in the target recognition model to obtain a tag prediction sequence, the tag prediction sequence being a set of attribution probabilities of the plurality of subvectors and a plurality of entity tags, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and inputting the tag prediction sequence into a condition discrimination layer in the target recognition model to determine target items in the set of attribution probabilities, the target items being used for indicating the entities in the target text information.

In yet another aspect, the present disclosure provides a non-transitory computer-readable storage medium storing computer program instructions executable by at least one processor to perform: acquiring target text information; inputting the target text information into an input representation layer in a target recognition model to generate a target vector sequence, the target vector sequence including a plurality of subvectors, the plurality of subvectors being obtained by representing the target text information based on at least two text dimensions; inputting the target vector sequence into a semantic representation layer in the target recognition model to obtain a tag prediction sequence, the tag prediction sequence being a set of attribution probabilities of the plurality of subvectors and a plurality of entity tags, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and inputting the tag prediction sequence into a condition discrimination layer in the target recognition model to determine target items in the set of attribution probabilities, the target items being used for indicating the entities in the target text information According to yet another aspect, an embodiment of the present disclosure provides a computing device, including: a memory, a processor, and a bus system, the memory being configured to store program code, and the processor being configured to perform the entity recognition method in the aspects.

According to yet another aspect, an embodiment of the present disclosure provides a computer-readable storage medium, storing a computer program, the computer program being configured to perform the entity recognition method in the aspects.

According to yet another aspect, an embodiment of the present disclosure provides a computer program product or a computer program, the computer program product or the computer program including computer instructions, the computer instructions being stored in a computer-readable storage medium. A processor of a computing device reads the computer instructions from the computer-readable storage medium and executes the computer instructions to cause the computing device to perform the entity recognition method in the aspect.

As can be seen from the technical solutions, the embodiments of the present invention have the following advantages:

For target text information of a to-be-recognized entity, the target text information is inputted into the input representation layer in the target recognition model to generate a target vector sequence. In order to enhance comprehensiveness of description of features of the target text information, the target text information is represented by at least two text dimensions. It is determined that a plurality of subvectors included in the target vector sequence are obtained by representing the target text information based on the at least two text dimensions. The target vector sequence is inputted into the semantic representation layer in the target recognition model to obtain a tag prediction sequence of a set of attribution probabilities of the plurality of subvectors and a plurality of entity tags respectively. The semantic representation layer includes a plurality of recognition nodes that are parallel and correlated with each other, so as to obtain respective context information of the recognition nodes, enhance integrity of semantic representation, and improve accuracy of subsequent recognition of the entity tags. Moreover, since the plurality of entity tags are set based on different categories of entities, the target text information can be correlated with more entity tags during the recognition, important features of the different categories of entities can be screened out, which enhances the capability to distinguish the entity categories. The tag prediction sequence is inputted to the condition discrimination layer in the target recognition model to determine target items, which are used for indicating the entities in the target text information, in the set of attribution probabilities. In this way, an efficient NER process is realized, and efficiency and accuracy of NER are improved.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
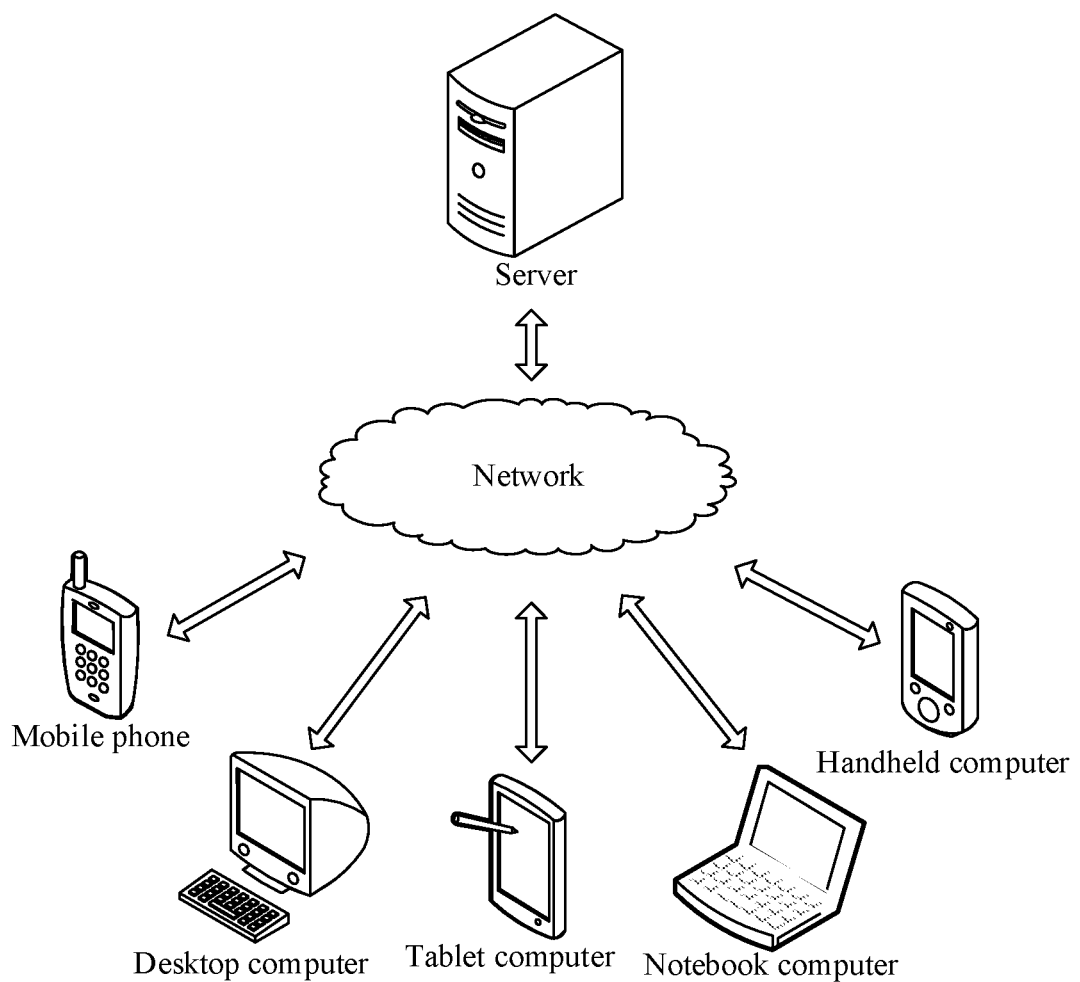
FIG. 1 is a schematic diagram of a network architecture in which an NER system operates.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The terms such as "first", "second", "third", and "fourth" (if any) in the present disclosure and claims of the present application and in the accompanying drawings are used for distinguishing between similar objects and not necessarily used for describing any particular order or sequence. It may be understood that the data used in such a way is interchangeable in proper circumstances, so that the embodiments of the present disclosure described herein can be implemented in other sequences than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

First, terms that may appear in the embodiments of the present disclosure are explained.

A long short-term memory (LSTM) network is a time recurrent neural network (RNN) and specially designed to solve the problem of long-term dependency of a general RNN. LSTM is suitable for processing and predicting important events with long intervals and delays in a time sequence.

Nature language processing (NLP) is an important direction in the fields of computer science and artificial intelligence. It studies various theories and methods that enable effective communication between humans and computers in natural language. NLP is a science that integrates linguistics, computer science and mathematics.

NER is an important tool in application fields such as information extraction, a question answering system, syntactic analysis, and machine translation. The NER plays an important role during practical application of an NLP technology. For example, three categories (entity class, time class, and number class) and seven subcategories (person name, institution, place name, time, date, currency, and percentage) of entities in to-be-processed text may be recognized by NER.

A conditional random field (CRF) is a discriminative probability model, which is a type of random field and is used for annotating or analyzing sequence data, for example, natural language text or biological sequences.

A short video, that is, a short video clip, is a manner of disseminating Internet content, and is generally video communication content with a duration within 5 minutes and disseminated on new Internet media. With the popularization of terminal devices and the acceleration of networks, short, moderate, and fast high-traffic communication content gradually gains favor of platforms, fans, and capital.

A multi-channel network (MCN) is a product form of multi-channel network, which combines professional generated content (PGC) and guarantees output of content with strong support of capital, so as to realize stable realization of businesses.

The PGC is professional generated content (video websites) and expert generated content (microblog). The PGC generally refers to content personalization, diversity of perspectives, democratization of communication, and virtualization of social relations. The PGC is also referred to as professionally-produced content (PPC).

User generated content (UGC) arises along with the concept of Web2.0 which is characterized by promotion of personalization. The UGC is not a specific service, but a new way for users to use the Internet, that is, from the original focus on downloading to both downloading and uploading.

Feeds are also translated as source materials, feeding, information provision, document feeds, abstract, sources, news feeds, and web sources. The feeds are a data format through which a website disseminates the latest information to users, generally arranged in a timeline. The timeline is the most original, intuitive, and display form of the feeds. The users can subscribe to a website based on a prerequisite that the website provides feeds. Merging of the feeds in one place is called aggregation, and software configured for aggregation is called an aggregator. For end users, the aggregator is software designed to subscribe to a website, also commonly known as an RSS reader, a feed reader, a news reader, or the like.

It is to be understood that the NER method according to the present disclosure is applicable to a computing device. The computing device includes, for example, a terminal device or a server. The terminal device includes a system or program with an NER function, for example, an interactive play. In certain embodiment(s), an NER system may operate in the network architecture shown in FIG. 1. FIG. 1 shows a diagram of a network architecture in which an NER system operates. As can be seen the figure, the NER system may provide an NER process with a plurality of information sources. That is, the server may accept text content sent by a plurality of terminals, recognize entities therein, and return recognition results corresponding to the terminals. It may be understood that FIG. 1 shows a plurality of terminal devices. In an actual scenario, more or fewer terminal devices may participate in the NER process, and a specific quantity and type depend on an actual scenario and are not limited herein. In addition, FIG. 1 shows one server, but in an actual scenario, a plurality of servers may be provided. A specific quantity of the server depends on an actual scenario.

In this embodiment, the server may be an independent physical server, or may be a server cluster including a plurality of physical servers or a distributed system, or may be a cloud server providing cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. The terminal and the server can be connected to form a blockchain network. This is not limited in the present disclosure.

It may be understood that the NER system may operate on a personal mobile terminal, for example, as an application such as the interactive play, may operate on a server, or may operate on a third-party device to provide NER to obtain NER processing results of information sources. A specific NER system may operate in the form of a program in the above device, may operate as a system component in the above device, or may operate as a cloud service program. A specific operation mode depends on an actual scenario and is not limited herein.

The present disclosure applies to natural language processing technology (NLP). NLP is an important direction in the fields of computer science and AI. It studies various theories and methods that enable effective communication between humans and computers in natural language. NLP is a science that integrates linguistics, computer science and mathematics. Therefore, research in this field involves natural language, that is, a language that people use daily, so it is closely related to the study of linguistics. NLP technologies usually include entity recognition, text processing, semantic understanding, MT, robot question answering, knowledge graphs and other technologies.

NER is also referred to as proper noun recognition, and is a fundamental task in NLP, with a wide range of applications. An entity generally refers to an entity with a specific meaning or strong referentiality in text, which generally includes a person name, a place name, an organization name, date and time, a proper noun, or the like. The NER system extracts the above entities from unstructured input text, and can recognize more categories of entities according to service desirables, such as a product name, a model, and a price. Therefore, the concept of entity may be broad. A special text fragment desired by a service may be called an entity. Desired data may be extracted by NER, which is a basis for subsequent content mining analysis, relation extraction, and event analysis.

Generally, during the NER, an AC algorithm may be adopted to find internal rules of pattern strings to achieve efficient jump at each mismatch. For example, NER may be performed on identical prefix relations between the pattern strings.

However, the NER based on AC algorithm matching has a single matching process and is prone to introduction of errors, it is difficult to continue to improve the accuracy, and manual review is desirable, affecting the efficiency of NER.

Figure 2:
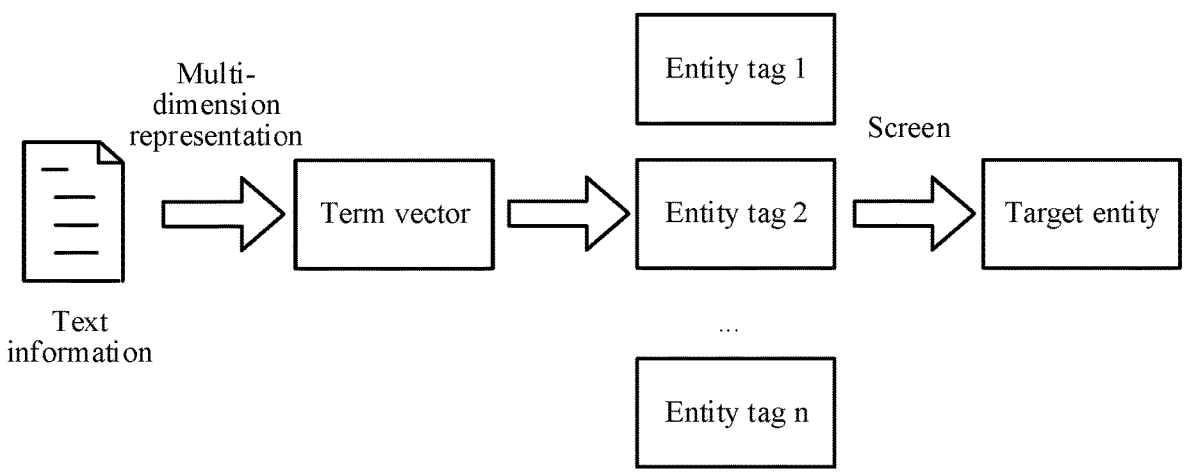
FIG. 2 is a schematic architectural diagram of a procedure of entity recognition according to certain embodiment(s) of the present disclosure.

To resolve the above problems, the present disclosure proposes an NER method. The method is applied to a process framework of NER shown in FIG. 2. FIG. 2 shows a diagram of a process architecture of NER according to an embodiment of the present disclosure. Vector transformation represented by multiple dimensions (for example, features in three dimensions of word, term, and part of speech) is performed on text information to obtain term vectors, different entity tags (e.g., entity tags 1-n) are matched to capture context-related information in a plurality of different subspaces, important features of different categories of entities are screened, which enhances the features' capability to distinguish entity categories and improves a recognition effect, and a target entity corresponding to the text information is determined.

It may be understood that the method according to the present disclosure may be writing of a program to be used as a processing logic in a hardware system, or may be used as an NER apparatus. The processing logic is implemented by integration or external connection. As one implementation, the NER apparatus acquires target text information, and inputs the target text information into the input representation layer in the target recognition model to generate a target vector sequence. The target vector sequence includes a plurality of subvectors. The subvectors are obtained by representation based on at least two text dimensions. The NER apparatus further inputs the target vector sequence into the semantic representation layer in the target recognition model to obtain a tag prediction sequence. The tag prediction sequence is a set of attribution probabilities of the subvectors and a plurality of entity tags. The semantic representation layer includes a plurality of parallel recognition nodes. The recognition nodes are correlated with each other. The recognition nodes are configured to recognize the attribution probabilities of the corresponding subvectors and the plurality of entity tags. The entity tags are set based on different categories of entities. The NER apparatus inputs the tag prediction sequence into the condition discrimination layer in the target recognition model to determine target items in the set of attribution probabilities. The target items are used for indicating the entities in the target text information. In this way, an efficient NER process is realized. Since a plurality of entity tags are used for matching, important features of different categories of entities can be screened, which enhances the capability to distinguish entity categories, does not desire a process of manual review, and improves efficiency and accuracy of NER.

The solutions provided in the embodiments of the present disclosure relate to technologies such as NLP of AI, which are described by using the following embodiments.

Figure 3:
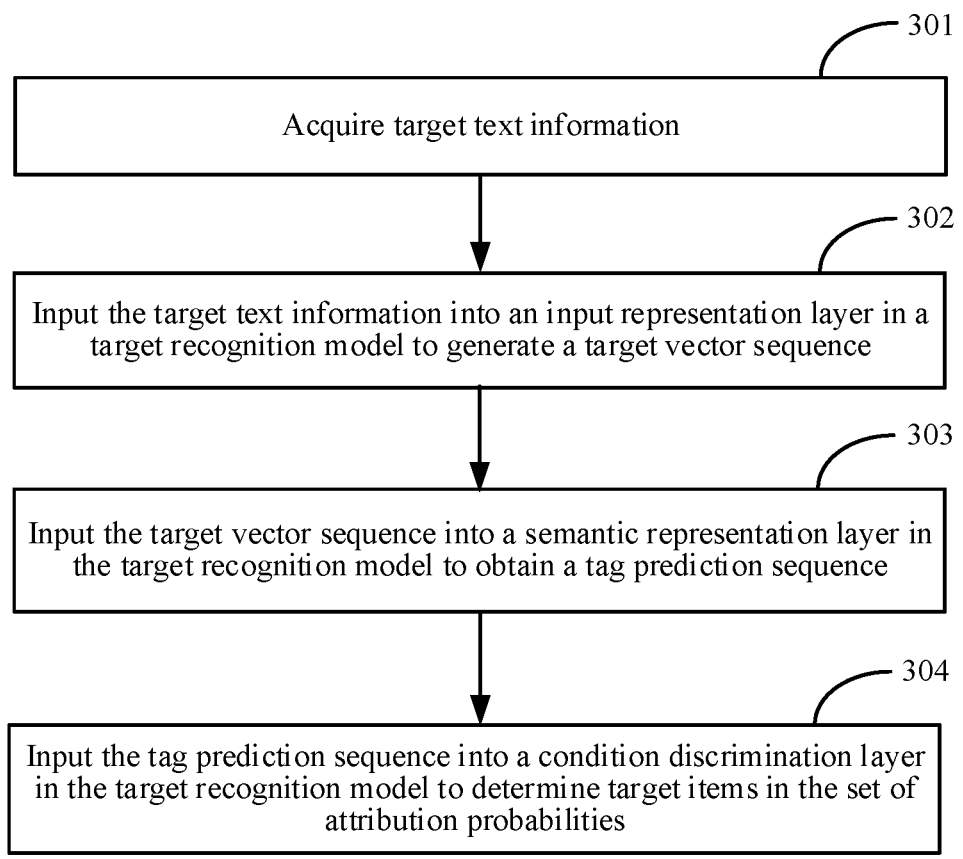
FIG. 3 is a schematic flowchart of an entity recognition method according to certain embodiment(s) of the present disclosure.

The NER method in the present disclosure is introduced below in conjunction with the above process architecture. Referring to FIG. 3, FIG. 3 is a flowchart of an NER method according to an embodiment of the present disclosure. The NER method may be performed by a terminal device, performed by a server, or performed by both a terminal device and a server. The following description is based on an example in which the method is performed by the terminal device. In the embodiment of the present disclosure, the method includes at least the following steps.

Step 301. Acquire target text information.

In this embodiment, the target text information may be from a variety of information sources, such as web pages, application programs, and interfaces.

In one possible implementation, when data acquired from an information source includes multimedia content, text information is extracted. That is, at first, target recognition data is acquired in response to a target operation. The target recognition data includes at least one media content form, for example, a short video. The target recognition data is textually interpreted based on the media content form to determine target text information. For example, an abstract part of the short video is interpreted, or a sound signal of the short video is recognized and converted into corresponding text information. A specific content form depends on an actual scenario and is not limited herein.

Step 302. Input the target text information into an input representation layer in a target recognition model to generate a target vector sequence.

In this embodiment, the target vector sequence includes a plurality of subvectors. The subvectors are obtained by representation based on at least two text dimensions. In order to ensure accuracy of description of the target text information, features in different dimensions may be used for description. For example, vector representation is performed using term and word dimensions.

In one possible implementation, the at least two text dimensions include a term dimension and a word dimension. At first, the target text information is inputted into the input representation layer in the target recognition model for term embedding to obtain a term embedding vector. Word embedding is performed on the target text information to obtain a word embedding vector. The target vector sequence is generated by taking the term embedding vector and the word embedding vector as the subvectors. In this way, feature dimensions of the target text information are improved, and comprehensiveness of feature description is ensured.

In one possible scenario, the term embedding vector may be processed by word2vec or a bag-of-words model, and the word embedding vector may be processed by random 01 vector string encoding. The term embedding and word embedding vectors are joined together as a target vector sequence. That is, in the identification, a separate representation position is left for a vector of word granularity, which is directly placed after the subvector by OneHot encoding of used words for example. For example, a target vector sequence of "Shi Pin (video)" is a sequence of "Shi Pin (video)", "Shi", and "Pin". Term embedding is generally pre-trained, while word embedding is randomly initialized, with an embedding process adjusted along with an iteration process of training.

It may be understood that each unit in the target text information is processed based on the above vector transformation processing manner to obtain a target vector sequence including a plurality of vector sequences. For example, each term in a sentence is treated as a unit for vector transformation.

Step 303. Input the target vector sequence into a semantic representation layer in the target recognition model to obtain a tag prediction sequence.

In this embodiment, the tag prediction sequence is a set of attribution probabilities of the subvectors and a plurality of entity tags. That is, a matching process is performed based on different categories of entity tags, which is a processing process of a multi-head attention mechanism. The multi-head attention mechanism increases the capability of the target recognition model to capture different position information in the target vector sequence. If parameters prior to mapping are directly used for computation, only a fixed weight probability distribution can be obtained. The probability distribution may focus on information of one or several positions. However, the matching process based on the multi-head attention mechanism can be correlated with entity tags at more positions. Moreover, since weights are not shared during the mapping, subspaces after the mapping are different, or different subspaces cover different information, so a vector finally obtained by splicing covers more information.

It may be understood that the semantic representation layer includes a plurality of parallel recognition nodes, the recognition nodes are correlated with each other, and the recognition nodes are configured to recognize the attribution probabilities of the corresponding subvectors and the plurality of entity tags. In certain embodiment(s), a bi-directional long short-term memory (BiLSTM) may be adopted for each recognition node. Due to the correlation between the recognition nodes, context information can be obtained during the semantic representation, which ensures the integrity of the semantic representation and ensures the accuracy of tag prediction.

Figure 4:
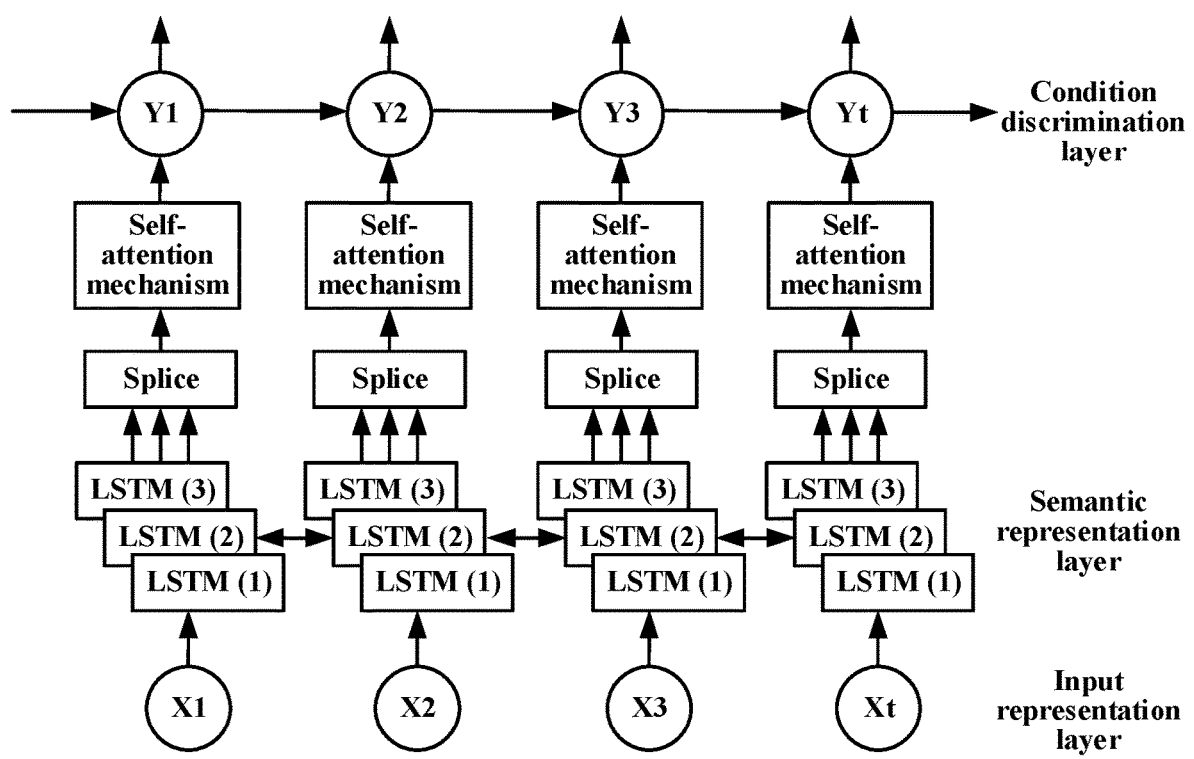
FIG. 4 is a schematic architectural diagram of a model of an entity recognition method according to certain embodiment(s) of the present disclosure.

In certain embodiment(s), refer to FIG. 4 which is a diagram of a model architecture of an NER method according to an embodiment of the present disclosure. The figure shows that the target recognition model includes an input representation layer, a semantic representation layer, and a condition discrimination layer. A target vector sequence is inputted through the input representation layer to obtain X1-Xt, multi-feature dimension correlation representation is performed through LSTM1-LSTM3 in the semantic representation layer, features are spliced, a multi-head matching operation is performed based on a self-attention mechanism, and more entity tags are correlated, so as to ensure accuracy of entity tags predicted for Y1-Yt inputted into the condition discrimination layer.

In one possible scenario, since position information of the subvectors can be obtained based on the multi-head attention mechanism, a BIESO-Type two-section annotation can be adopted for the corresponding predicted tags. The first section includes begin, inside, and end, which represent begin (B), inside (I), and end (E) positions of an entity respectively. In addition, Single represents a single-word entity and Other represents a non-entity. For the second section, Type includes PER, LOC, ORG, GAME, and BOOK which correspond to a person name, a place name, an organization name, a game, and a book respectively. For example, a data set mined for Person and Organization includes a total of 8 categories of tags: B-Person (begin of the Person), I-Person (inside of the Person), E-Person (end of the Person), B-Organization (begin of the Organization), I-Organization (inside of the Organization), E-Organization (end of the Organization), O (non-entity information), and S-(single-word entity). A specific tag type depends on an actual scenario and is not limited herein.

In certain embodiment(s), settings of the tags may further include S-ORG which represents Organization, S-GAME which represents Game, S-Book which represents Book, S-Music which represents Music, S-Food which represents Food, S-Health which represents Health, S-Tourist which represents Tourist, S-Military which represents Military, S-antiques which represents Antiques, and so on. Specific classes and types of mined entities and distribution of service desirables and content categories depend on an actual scenario.

Figure 5:
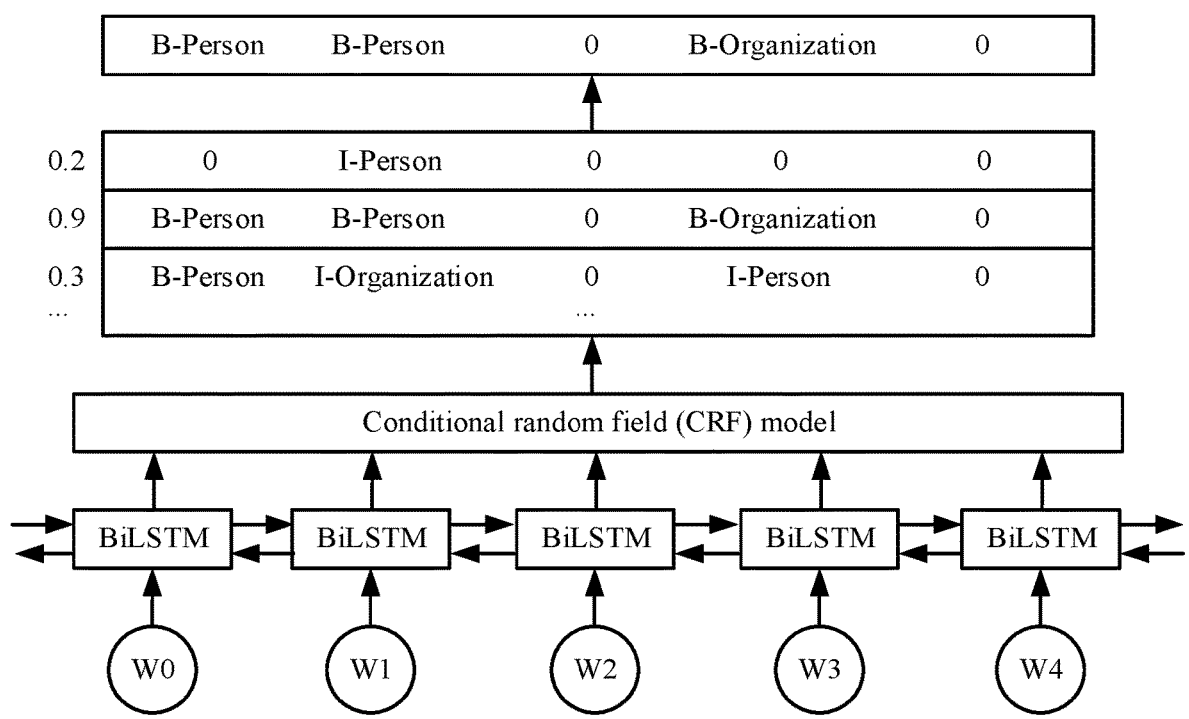
FIG. 5 is a schematic architectural diagram of a model of another entity recognition method according to certain embodiment(s) of the present disclosure.
Figure 6:
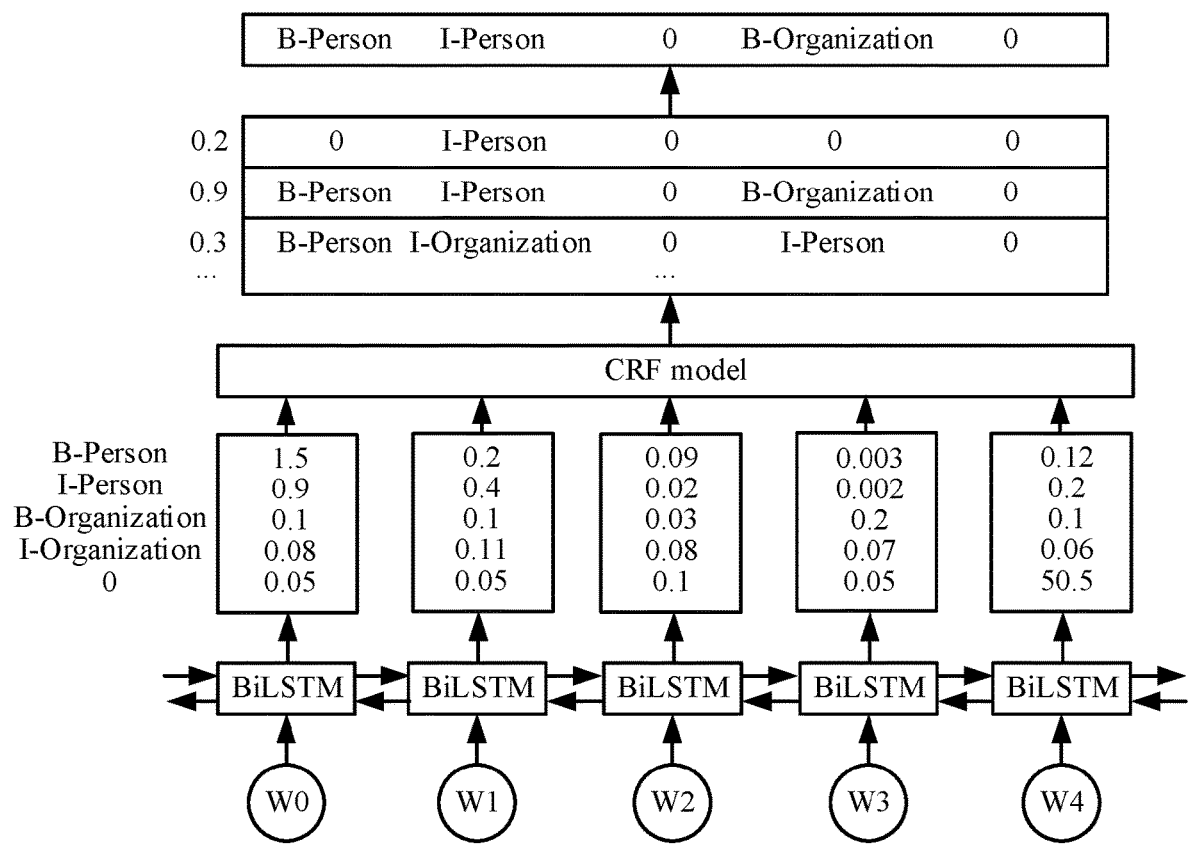
FIG. 6 is a schematic architectural diagram of a model of another entity recognition method according to certain embodiment(s) of the present disclosure.

An operation process of the target recognition model is described below by taking a recognition process of Person and Organization as an example. Refer to FIG. 5 which is a diagram of a model architecture of another NER method according to an embodiment of the present disclosure. The figure shows that a piece of text information x added to the target recognition model is a sentence (w0, w1, w2, w3, w4) including 5 words. In the sentence x, [w0, w1] is Person, [w3] is Organization, and others are "0". Output of a BiLSTM layer (semantic representation layer) represents a score (attribution probability) of the word corresponding to each category. Referring to FIG. 6, for w0, output of a BiLSTM node (recognition node) is 1.5 (B-Person), 0.9 (I-Person), 0.1 (B-Organization), 0.08 (I-Organization), and 0.05 (O). The scores may be used as input of a CRF layer.

Step 304. Input the tag prediction sequence into a condition discrimination layer in the target recognition model to determine target items in the set of attribution probabilities.

In this embodiment, the target items are used for indicating the entities in the target text information, that is, recognition results.

In certain embodiment(s), referring to the embodiment shown in FIG. 5 in step 303, after the scores are used as input of the CRF layer, the CRF layer may determine target items therein, for example, use the entity tag with the highest attribution probability (highest score) as a target item. It can be obtained that entity recognition results are w0 (B-Person), w1 (I-Person), w2 (B-Organization), w3 (I-Organization), and w4 (O). The CRF layer may be used as a step of adjusting the recognition process based on part-of-speech features. Therefore, according to the above classification and combination of word and term granularity, three features of word, term, and part of speech can be used for NER.

It may be understood that the process of determining the target items is equivalent to setting constraint conditions for the tag prediction sequence in the condition discrimination layer. That is, at first, the tag prediction sequence is inputted into the condition discrimination layer in the target recognition model to acquire constraint conditions in the conditional discriminant layer. The attribution probability corresponding to each of the subvectors is screened based on the constraint conditions to determine the target items in the set of attribution probabilities. The constraint conditions are set based on preset global information.

In certain embodiment(s), the CRF layer can also learn constraint conditions of sentences, and global constraint information can be added through the CRF layer to ensure that final prediction results are effective. The constraint conditions may be automatically learned by the CRF layer when training data. For example, possible constraint conditions include: sentences beginning with "B-" or "O", not "I-" or "E-", or the like.

For a scenario in which global information is set, during the recognition, at first, candidate tags corresponding to the subvectors in the tag prediction sequence may be determined. The candidate tags include position identifiers and tag identifiers. A corresponding relation between the position identifiers and the tag identifiers is screened based on the constraint conditions to determine the target items in the set of attribution probabilities. For example, tags that cannot appear at the beginning of a sentence are screened out to ensure the accuracy of NER.

In certain embodiment(s), the CRF layer may also be trained based on a transition matrix. At first, an initialization transition matrix is acquired. The initialization transition matrix is trained based on global information corresponding to the target text information to obtain a target transition matrix. The constraint conditions are determined according to distribution of transition scores in the target transition matrix. That is, the influence of neighboring tags is taken into account while an attribution probability of a current tag is considered. In certain embodiment(s), in the scenario shown in FIG. 6, FIG. 6 is a diagram of a model architecture of another NER method according to an embodiment of the present disclosure. For example, tB-Person, I-Person=0.9 indicates that a score from the category B-Person to I-Person is 0.9, which may be determined as an attribution score of w2.

It may be understood that scores of a transition matrix can be randomly initialized prior to the training of the CRF layer. The scores may be updated along with an iterative process of training. That is, the CRF layer can learn the constraint conditions. The transition scores between different categories constitute the transition matrix. That is, tags satisfying the transition matrix may be used as recognition results. A main function of the transition scores is to help the CRF to calculate a loss function, which consists of two parts: a score of a true path and a total score of all paths. The scores of the transition matrix directly affect a final loss function, so as to realize constraints and ensure the accuracy of NER.

In one possible scenario, for a prediction sequence "B-label1 I-label2 I-label3 . . . ", categories 1, 2, 3 may be of the same entity category. For example, "B-Person I-Person" is correct, while "B-Person I-Organization" is incorrect. "O I-label" is incorrect, and the entity begins with "B-" instead of "I-". With such useful constraint rules, incorrect prediction sequences of model may be greatly reduced finally. Unreasonable tag sequences in the results are prevented using global information constraints, so that accuracy of the whole content entity mining efficiency can be greatly improved.

As can be seen from the above embodiment, for target text information of a to-be-recognized entity, the target text information is inputted into the input representation layer in the target recognition model to generate a target vector sequence. In order to enhance comprehensiveness of description of features of the target text information, the target text information is represented by at least two text dimensions. It is determined that a plurality of subvectors included in the target vector sequence are obtained by representing the target text information based on the at least two text dimensions. The target vector sequence is inputted into the semantic representation layer in the target recognition model to obtain a tag prediction sequence of a set of attribution probabilities of the plurality of subvectors and a plurality of entity tags respectively. The semantic representation layer includes a plurality of recognition nodes that are parallel and correlated with each other, so as to obtain respective context information between the recognition nodes, enhance integrity of semantic representation, and improve accuracy of subsequent recognition of the entity tags. Moreover, since the plurality of entity tags are set based on different categories of entities, the target text information can be correlated with more entity tags during the recognition, important features of the different categories of entities can be screened out, which enhances the capability to distinguish the entity categories. The tag prediction sequence is inputted to the condition discrimination layer in the target recognition model to determine target items, which are used for indicating the entities in the target text information, in the set of attribution probabilities. In this way, an efficient NER process is realized, and efficiency and accuracy of NER are improved.

Figure 7:
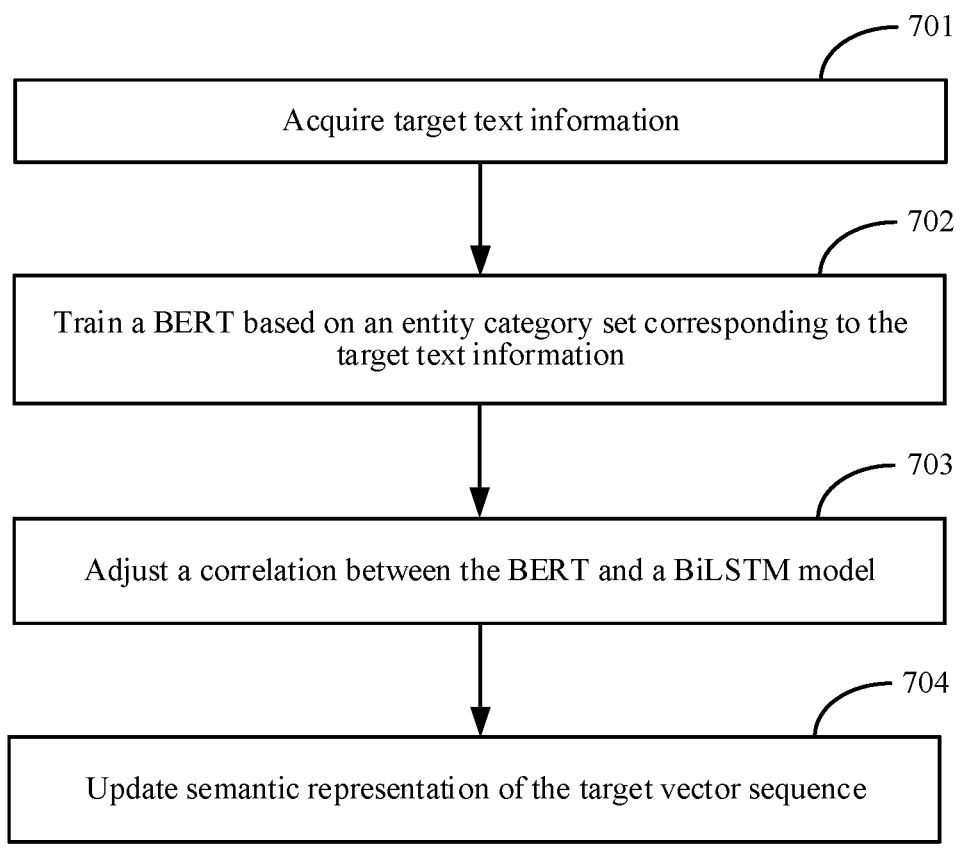
FIG. 7 is a schematic flowchart of another entity recognition method according to certain embodiment(s) of the present disclosure.

In one possible scenario, during the semantic representation, targeted and accurate training data are desirable to achieve a good recognition effect, but it takes much time and effort to prepare the accurate training data. To better mine and acquire semantics of original text, a bidirectional encoder representation from transformers (BERT) may be added on the basis of an original semantic representation layer (BiLSTM model), so that the semantic representation layer can learn context information, and an NER effect can be improved. The scenario is introduced below. In certain embodiment(s), the process shown in FIG. 7 can be used. FIG. 7 is a flowchart of another NER method according to an embodiment of the present disclosure. In the embodiment of the present disclosure, the method includes at least the following steps.

Step 701. Acquire target text information.

In this embodiment, step 701 is similar to step 301 in the embodiment shown in FIG. 3. Details are not described herein.

Step 702. Train a BERT based on an entity category set corresponding to the target text information.

Figure 8:
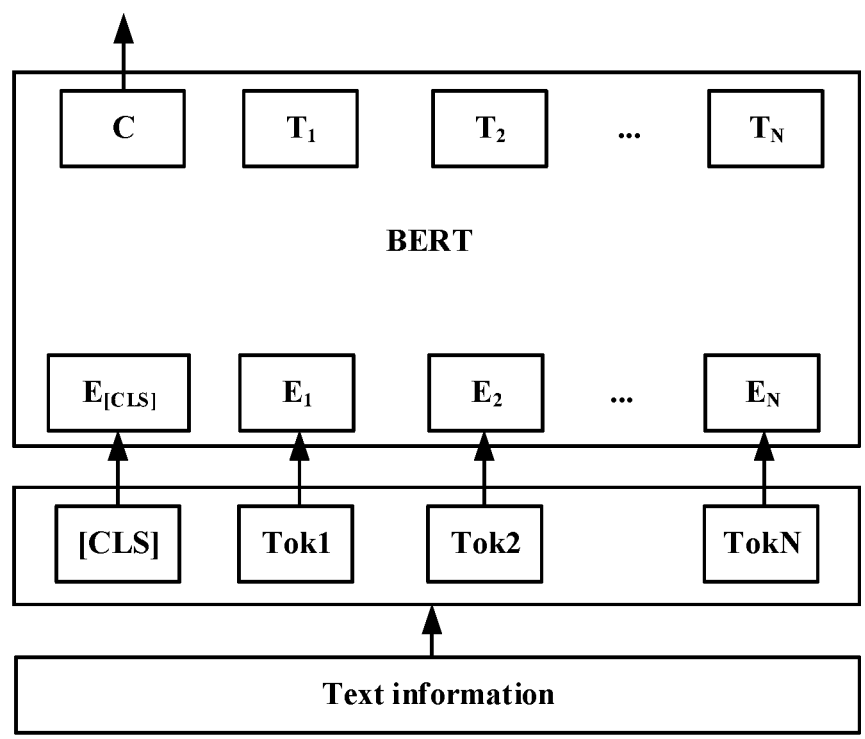
FIG. 8 is a schematic architectural diagram of a model of another entity recognition method according to certain embodiment(s) of the present disclosure.

In this embodiment, in order to improve adaptability of the BERT to the target text information, the entity category set corresponding to the target text information can be called to train the BERT. A structure of the BERT is shown in FIG. 8. FIG. 8 is a diagram of a model architecture of another NER method according to an embodiment of the present disclosure. Token is a minimum granularity unit after each word segmentation, CLS represents the begin of an independent sentence. In addition, C is short for CLS and the begin of a sentence. T1, . . . , TN are short for independent segmented words Tok1 to TokN.

In certain embodiment(s), at first, a preset entity set corresponding to the target text information is acquired. A target category in the preset entity set is determined. The BERT is trained based on the target category, so that the BERT adapts to the target text information. For example, on the basis of a PreTrain Model (BERT-Base, Chinese), finetune is performed through multi-type entity annotation data to obtain a BERT layer of an NER model supporting multiple entities, so as to improve the accuracy of recognition.

Step 703: Adjust a correlation between the BERT and a BiLSTM model.

Figure 9:
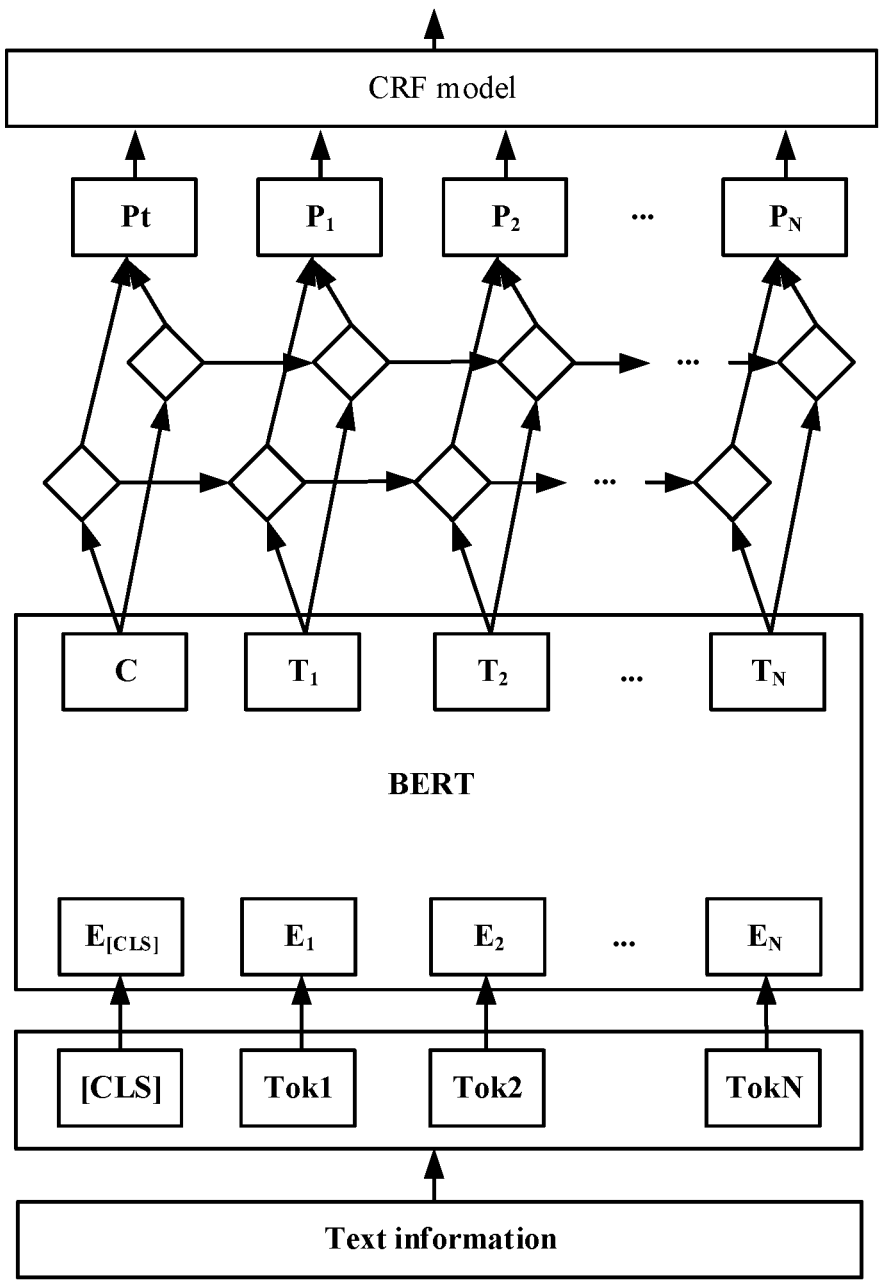
FIG. 9 is a schematic architectural diagram of a model of another entity recognition method according to certain embodiment(s) of the present disclosure.

In this embodiment, a BERT model and a BiLSTM model may be in a correlation of sequential connection. That is, the BERT model serves as a pre-layer of the BiLSTM model, as shown in FIG. 9. FIG. 9 is a diagram of a model architecture of another NER method according to an embodiment of the present disclosure. A process of generating a tag prediction sequence in the scenario may involve: first, inputting a target vector sequence into the BERT to obtain a first semantic representation; inputting the first semantic representation into the BiLSTM model to obtain a target semantic representation; and matching the plurality of entity tags based on the target semantic representation to obtain the tag prediction sequence. E represents position encoding of Token in the sentence. For example, the position of the first term at the beginning of the sentence is 0, and numbers are successively encoded. T represents an outputted encoding result. P represents being spliced together as input of next stage. That is, the CRF layer is entered for screening.

In the scenario, the process of semantic representation involves bidirectional description. That is, first, the first semantic representation is inputted into the BiLSTM model for first order-based computation to obtain upper information. The first semantic representation is inputted into the BiLSTM model for second order-based computation to obtain lower information. Splicing is performed based on the upper information and the lower information to obtain the target semantic representation. In this way, the acquisition of context information is ensured, and accuracy of the semantic representation is improved.

Figure 10:
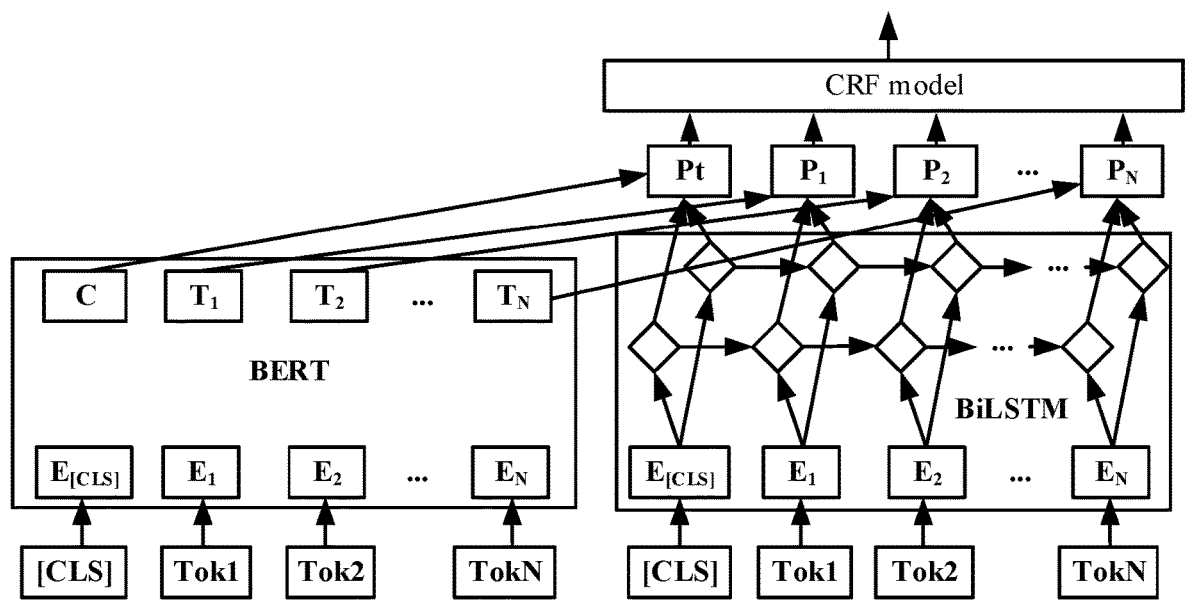
FIG. 10 is a schematic architectural diagram of a model of another entity recognition method according to certain embodiment(s) of the present disclosure.

In addition, a BERT model and a BiLSTM model may also be in a correlation of parallel connection, as shown in FIG. 10. FIG. 10 is a diagram of a model architecture of another NER method according to an embodiment of the present disclosure. A process of generating a tag prediction sequence in the architecture in the figure may involve: first, inputting a target vector sequence into the BERT to obtain a first semantic representation; inputting the target vector sequence into the BiLSTM model to obtain a second semantic representation; splicing the first semantic representation and the second semantic representation to obtain a target semantic representation; and matching the plurality of entity tags based on the target semantic representation to obtain the tag prediction sequence. That is, a BERT encoding result (first semantic representation) and a BiLSTM encoding result (second semantic representation) are directly spliced on a P layer. It may be understood that 2 channels in the original input are encoded by delayed fusion. After performance of the encoding, results are spliced, so that semantic representation of original in-depth text can be better extracted.

It may be understood that the manner of parallel connection has a smaller network computation depth and higher computation efficiency than the manner of sequential connection, and is suitable for places with higher desirables on a computation speed and a prediction speed, while the sequential connection is suitable for places with higher accuracy.

In certain embodiment(s), a fusion manner may be determined based on magnitude of data processing and a service scenario. That is, a text size corresponding to the target text information is acquired. A manner in which the target vector sequence is inputted into the BERT and the BiLSTM model is determined based on the text size. For example, if the text size is greater than 1 G, parallel connection is selected for text representation, so as to improve the adaptability of the recognition process to the scenario.

Step 704. Update semantic representation of the target vector sequence.

In this embodiment, more comprehensive semantic representation can be outputted based on the setting of the correlation between the BERT model and the BiLSTM model. If the correlation is set during the recognition, original semantic representation may be updated to improve comprehensiveness of the semantic representation.

As can be seen from the above embodiment, in this embodiment, a recommended entity recognition algorithm in content distribution of an information stream is upgraded from matching to a multi-category entity joint recognition model including a BERT+BiLSTM-CRF+Self-Attention target recognition model architecture. The whole model adopts three features: word, term, and part of speech. A multi-head self-attention layer is introduced between a BiLSTM layer and a CRF layer to capture context-related information in a plurality of different subspaces, and important features of different categories of entities are screened, which enhances the features' capability to distinguish entity categories and improves a recognition effect. In addition, to resolve the problem of low accuracy caused by difficult acquisition of training data, a Bert semantic extraction layer is added to the input representation layer, and two different manner of fusing with the BiLSTM are adopted to achieve an optimal effect. Finally, a tag sequence is modeled using the CRF, and unreasonable tag sequences in the results are prevented using global information constraints, so that accuracy of the whole content entity mining efficiency can be greatly improved.

Further, through the present disclosure, in the recommendation of the information stream, text content can be efficiently structured, a good foundation and effective auxiliary input can be provided for a number of subsequent tasks (such as relation extraction and event extraction), relation categories between entity pairs in unstructured text are determined, and structured data is formed for storage and access. In addition, structured data, such as keywords, classification, topics, and entity nouns, is generated, which can effectively help to build a knowledge graph and user portraits. The deeper the content analysis goes, the more effective information can be provided for a recommendation system to use. The more detailed user groups can be captured, the higher a recommendation conversion rate. Entity information extracted by the algorithm may be used as supplements to manually marked classification, topic and event information, assist manual annotation, and save labor costs.

Figure 11:
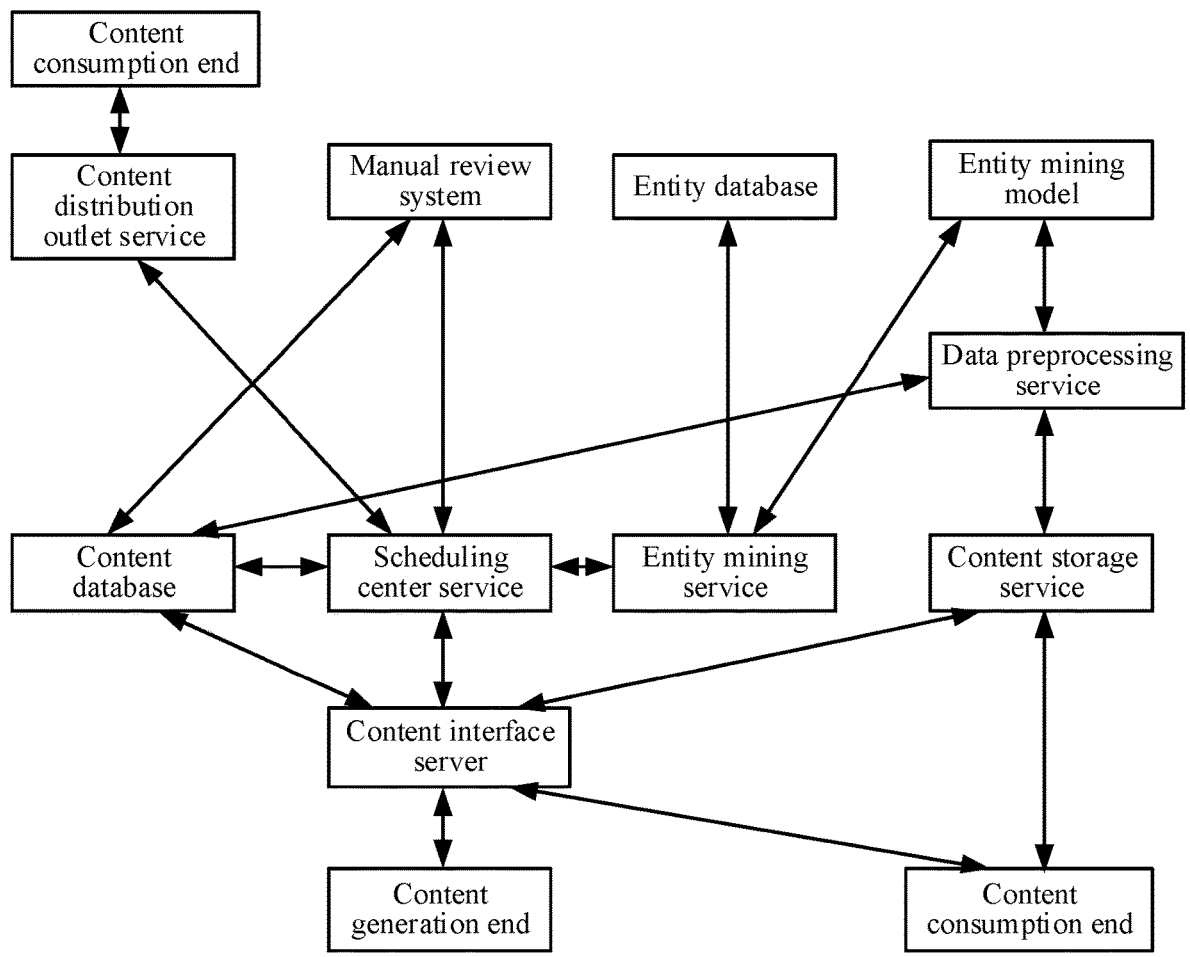
FIG. 11 is a schematic diagram of a system architecture of an entity recognition method according to certain embodiment(s) of the present disclosure.

In another possible scenario, the above embodiment is applicable to a content recognition system shown in FIG. 11. FIG. 11 is a diagram of a system architecture of another NER method according to an embodiment of the present disclosure.

The figure shows a content entity mining method based on a deep learning model and a system flowchart. Content distributed in the information stream includes a corresponding title of the content, description text of the content, and image-text content body, and video includes too little text information (only a title or video voice-to-text may include some text by text extraction through subtitle OCR), all of which are original information of mining input. Content entity mining is performed on the text information to acquire structured data. Structured text may have many purposes. For example, keywords, classification, topics, entity nouns, and the like are used for building a knowledge graph and portraits (including user portraits and item portraits), which is a basis for many subsequent tasks and processing. Three most important subtasks of information extraction are as follows. Entity extraction, namely NER, includes finding and classifying entities. The entity extraction or NER plays an important role in information extraction, which extracts atomic information elements in text, such as a person name, an organization/institution name, a geographical location, an event/date, a character value, and an amount value. Subsequent content analysis of relation extraction and event extraction has to be based on content entity mining. As shown in the above figure, in the whole process of content processing, after content released by a content producer is at a release entrance, an entity mining service is called through a scheduling center service to perform content entity mining, and mining results are saved in an entity database to provide services for the recommendation system.

Main functions of service modules in the system are described below.

I. Content Generation and Consumption Ends (1) A PGC, UGC, or MCN content producer provides image-text or video content through a mobile terminal or back-end interface API system, all of which are main content sources of recommended content for distribution.

(2) Image-text content is uploaded through communication with an uplink and downlink content interface service. A source of the image-text content is generally a lightweight release end and a content edit entrance, and video content is generally released by a photography end. During the shooting, local video content may be selected with music, a filter template, and a video beautification function, etc.

(3) As a consumer, the content consumption end communicates with an uplink and downlink content interface server, acquires index information of accessed content by recommendation, and communicates with a content storage server to acquire corresponding content including recommended content and special subscriptions. The content storage server stores content entities, such as video source files and image source files. Content meta-information, such as a title, an author, a cover image, classification, and Tag information, is stored in a content database.

(4) In addition, a user's play behavior data, delay, loading time and play click during the uploading and downloading are reported to the back end for statistical analysis.

(5) The consumption end browses content data through Feeds streams.

II. Plink and Downlink Content Interface Server (1) The uplink and downlink content interface server directly communicates with the content generation end. Content submitted from the front end includes a title of the content, a publisher, abstract, a cover image, release time, and content body. A file is stored in the content database.

(2) Meta-information of the image-text content, such as a file size, a cover image link, a title, release time, an author, and content body, is written into the content database. For video content, a video file is saved in a video storage service, and a cover image file and video meta-information are stored in the content database like the image-text content.

(3) Released and submitted content is synchronized to a scheduling center server for subsequent content processing and transfer.

III. Content Database (1) The content database is a core database of content. Meta-information of content released by all producers is saved in the service database, focusing on meta-information of the content, such as a file size, a cover image link, a bit rate, a file format, a title, release time, an author, a video file size, a video format, whether it is originally tagged or first published, and classification of the content during manual review (including first-, second-, third-level classification and tag information; for example, in an article about Huawei mobile phones, the first-level classification is Science and Technology, the second-level classification is Smart Phone, the third-level classification is Domestic Mobile Phone, and the tag information is Huawei, mate30).

(2) During the manual review, the information in the content database may be read, and results and states of manual review may also be transmitted back to the content database.

(3) Processing of a scheduling center on the content includes machine processing and manual review processing. The machine processing involves various quality judgments, such as low-quality filtering, content tags such as classification and tag information (to acquire the classification and tag information, a precondition is to perform entity information mining on the content, which is also performed by the scheduling center service, but final entity mining results are stored in the entity database), and content deduplication. Results thereof may be written into the content database, and the exact same content may not be manually processed twice.

(4) During subsequent extraction of tags and classification, meta-information of the content may be read from the content database, and a data preprocessing service also reads meta-information from a meta-database.

IV. Scheduling Center Service (1) The scheduling center service is responsible for an entire scheduling process of content transfer, receives incoming content through the uplink and downlink content interface server, and acquires the meta-information of the content from the content database.

(2) The scheduling center service schedules a manual review system and a machine processing system to control a scheduling sequence and priority.

(3) The content is enabled through the manual review system, and is directly provided for content consumers of a terminal through a display page of a content outlet distribution service (generally a recommendation engine or search engine or operation), which is also index information of the content obtained by the consumption end.

(4) For communication with an entity mining service, text information included in the content is inputted, a variety of content entity information included in the text is mined, the text is structurally extracted and stored, and mined entity result information is saved in the entity database.

V. Content Storage Service (1) Content entity information other than the meta-information of the content is stored, such as a video source file and an image source file of image-text content.

(2) During tag extraction of video content, a video source file provided for a tag service includes frame extraction content inside the source file.

(3) After acquiring the index information of the content, the content consumption end also directly accesses the content storage service to consume actual content.

VI. Manual Review System (1) The manual review system is a carrier of manual service capability, configured to check and filter content that cannot be determined by the machine, such as politically sensitive, pornographic, and legally prohibited content, and further tag the video content and confirm the video content twice.

VII. Data Processing Service (1) Original data is acquired from the meta-database and content storage data. In the entity mining, text data is preprocessed by sequence annotation and used as sample data for pre-training an entity mining model.

(2) The text is processed by word segmentation. For the video content, text information in the video may be extracted by extracting subtitle in the video or by voice-to-text, which is used as a channel and source of the text information by using a related technology.

VIII. Entity Mining Model (1) According to the entity mining modeling method described above, a target recognition model including a BERT+BiLSTM-CRF+Self-Attention architecture is constructed based on the above embodiment.

(2) Samples and data for model training are from the data preprocessing service.

IX. Entity Database (1) Entity results mined by the entity mining service are saved, which provides a data basis for subsequent tasks such as content tag classification, relation and event extraction.

X. Entity Mining Service (1) Scheduling from the scheduling center is accepted. For image-text content newly released on a link, the entity mining service is called through the scheduling center service to perform content entity mining, and mining results are saved in the entity database to provide services for the recommendation system.

(2) The entity mining model described above is servicized to accept scheduling of a core scheduling service scheduling center on the link.

XI. Content Distribution Outlet Service (1) The content distribution outlet service is an outlet for outputting machine- and manually processed link content. The scheduling center processes a finally generated recommended content pool for distribution through the outlet service.

(2) A main manner of distribution includes recommendation algorithm distribution and manual operation.

(3) The content distribution outlet service directly communicates with users of the content consumption end, and provides index information of recommended content for distribution, which is also an outlet of an information stream feed.

In another possible scenario, the NER method according to the present disclosure is applicable to an interaction process of social networks. That is, by recognizing content sent by users, related identifiers are set or associated. Social networks originate from social networking. The social networking begins with e-mails. The Internet is essentially networking between computers. Early e-mails resolve the problem of remote mail transmission, which is also the most popular application on the Internet so far and also the starting point of social networking. BBS goes a step further and normalizes "group sending" and "forwarding", theoretically realizing a function of releasing information to all people and discussing topics (bounded by a quantity of visitors to the BBS). The BBS becomes a platform for spontaneous generation of early Internet content. In recent two years, due to comprehensive popularization of smart phones, ubiquitous wi-fi facilities, general reduction of 4G charges, and an upcoming 5G era, users' demand for receiving information in the strong context of the current mobile Internet era is transitioning from an image-text era to a video era. Therefore, the short video may gradually become one of the dominant content forms of mobile Internet, replacing consumption of image-text content to some extent, and gradually gaining a dominant position in image-text media such as news and social networking platforms. Such content is generally displayed in the form of Feeds streams for users to quickly refresh, so how to quickly perform content review is a problem.

A description is provided below in conjunction with a scenario of video online review in a short video application. The short video refers to video content that is played on various new media platforms, suitable for watching in a mobile state and a short-term leisure state, and pushed at high frequencies, ranging from a few seconds to a few minutes. The content integrates skills sharing, humor, fashion trends, social hot spots, street interviews, public welfare education, advertising creative, commercial customization, and other topics. The content is short, and thus may be a separate clip, or a series of columns. Different from micro films and live streaming, short video production, unlike the micro films which have specific expression forms and team configuration desirables, is featured with a simple production process, a low production threshold, and strong participation, and has more communication value than the live streaming. An ultra-short production cycle and interesting content pose certain challenges to copywriting and planning skills of a short video production team. Excellent short video production teams generally rely on mature operating we-media or IP, and also have strong fan channels in addition to high-frequency and stable content output. The emergency of the short video has enriched the form of native advertising of new media. At present, from UGC, PGC, user upload at the beginning to institutions specializing in the production of short videos, to MCN, and to rise of professional short video apps and many other heading traffic platforms, the short video has become one of the important communication manners in content entrepreneurship and social media platforms. The short video has triggered a carnival of content entrepreneurs and impacted video media platforms. In addition, influence thereof has been further upgraded, and information platforms have also launched a battle around the short video. Therefore, a variety of short video content is getting richer and richer. Both short video content producers and consumers have become a huge group.

Figure 12:
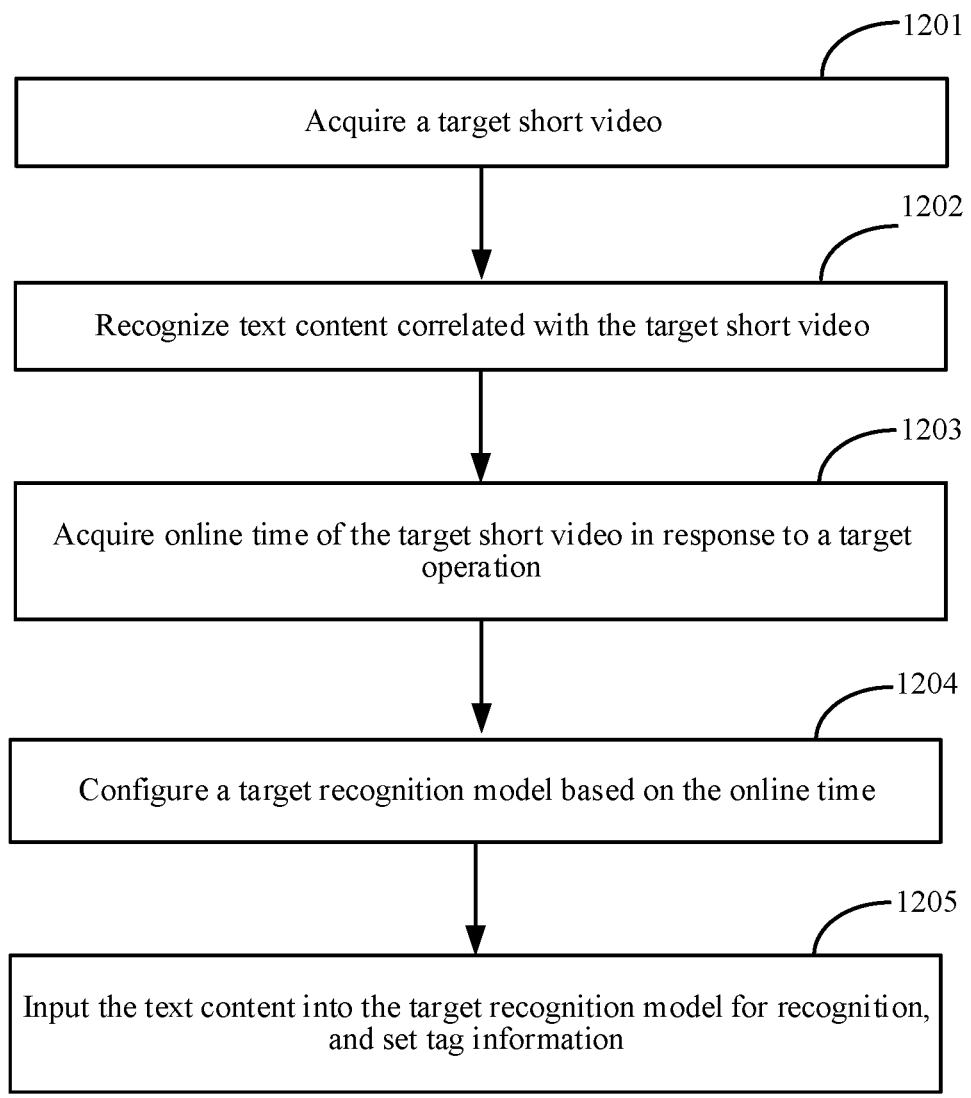
FIG. 12 is a schematic flowchart of another entity recognition method according to certain embodiment(s) of the present disclosure.

In certain embodiment(s), referring to FIG. 12, FIG. 12 is a flowchart of another NER method according to an embodiment of the present disclosure. In the embodiment of the present disclosure, the method includes at least the following steps.

Step 1201. Acquire a target short video.

In this embodiment, the target short video may be acquired during user upload. That is, content review and tag setting are performed on the target short video.

Step 1202. Recognize text content correlated with the target short video.

In this embodiment, a process of recognizing text content correlated with the target short video may be obtained with reference to the process of step 301 to step 304 in FIG. 3. Details are not described herein.

Step 1203. Acquire online time of the target short video in response to a target operation.

In this embodiment, the target operation may be the user choosing whether a quick review is desirable, or the user setting a release date close to the current time to determine whether the online time is loose or tight.

Step 1204. Configure a target recognition model based on the online time.

In this embodiment, if the online time is loose, a target recognition model connected successively to the BERT model and the BiLSTM model can be selected to ensure the accuracy of recognition. If the online time is urgent, a target recognition model connected in parallel to the BERT model and the BiLSTM model can be selected to ensure the efficiency of recognition.

The specific time may be set based on a duration threshold. That is, if an interval between the release date and the current time is less than the duration threshold, the time is urgent. If the interval between the release date and the current time is greater than the duration threshold, the time is loose.

Step 1205. Input the text content into the target recognition model for recognition, and set tag information.

In this embodiment, by acquiring recognized entities, the target short video can be tagged, such as setting keywords, which may also be used for determining a correlated video. For example, after watching the target short video, the user determines a correlated video according to tag information of the target short video, so as to improve a frequency of interaction between the user and the short video and improve user activation.

Figure 13:
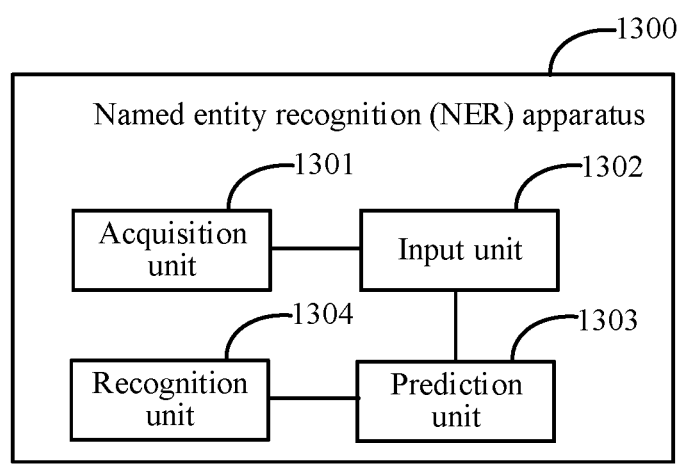
FIG. 13 is a schematic structural diagram of an entity recognition apparatus according to certain embodiment(s) of the present disclosure.

In order to better implement the above solutions in the embodiments of the present disclosure, a related apparatus for implementing the above solutions is further provided below. Referring to FIG. 13, FIG. 13 is a schematic structural diagram of an NER apparatus according to an embodiment of the present disclosure. The NER apparatus 1300 includes: an acquisition unit 1301 configured to acquire target text information; an input unit 1302 configured to input the target text information into an input representation layer in a target recognition model to generate a target vector sequence, the target vector sequence including a plurality of subvectors, the plurality of subvectors being obtained by representing the target text information based on at least two text dimensions; a prediction unit 1303 configured to input the target vector sequence into a semantic representation layer in the target recognition model to obtain a tag prediction sequence, the tag prediction sequence being a set of attribution probabilities of the plurality of subvectors and a plurality of entity tags respectively, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and a recognition unit 1304 configured to input the tag prediction sequence into a condition discrimination layer in the target recognition model to determine target items in the set of attribution probabilities, the target items being used for indicating the entities in the target text information.

In certain embodiment(s), in some possible implementations of the present disclosure, the at least two text dimensions include a term dimension and a word dimension, and the input unit 1302 is further configured to input the target text information into the input representation layer in the target recognition model for term embedding to obtain a term embedding vector; the input unit 1302 is further configured to perform word embedding on the target text information to obtain a word embedding vector; and the input unit 1302 is further configured to generate the target vector sequence by taking the term embedding vector and the word embedding vector as the subvectors.

In certain embodiment(s), in some possible implementations of the present disclosure, the semantic representation layer includes a BERT and a BiLSTM model, and the prediction unit 1303 is further configured to input the target vector sequence into the BERT to obtain a first semantic representation; the prediction unit 1303 is further configured to input the first semantic representation into the BiLSTM model to obtain a target semantic representation; and the prediction unit 1303 is further configured to match the plurality of entity tags based on the target semantic representation to obtain the tag prediction sequence.

In certain embodiment(s), in some possible implementations of the present disclosure, the prediction unit 1303 is further configured to input the first semantic representation into the BiLSTM model for first order-based computation to obtain upper information; the prediction unit 1303 is further configured to input the first semantic representation into the BiLSTM model for second order-based computation to obtain lower information; and the prediction unit 1303 is further configured to perform splicing based on the upper information and the lower information to obtain the target semantic representation.

In certain embodiment(s), in some possible implementations of the present disclosure, the semantic representation layer includes a BERT and a BiLSTM model, and the prediction unit 1303 is further configured to input the target vector sequence into the BERT to obtain a first semantic representation; the prediction unit 1303 is further configured to input the target vector sequence into the BiLSTM model to obtain a second semantic representation; the prediction unit 1303 is further configured to splice the first semantic representation and the second semantic representation to obtain a target semantic representation; and the prediction unit 1303 is further configured to match the plurality of entity tags based on the target semantic representation to obtain the tag prediction sequence.

In certain embodiment(s), in some possible implementations of the present disclosure, the prediction unit 1303 is further configured to acquire a text size corresponding to the target text information; and the prediction unit 1303 is further configured to determine, based on the text size, a manner in which the target vector sequence is inputted into the BERT and the BiLSTM model.

In certain embodiment(s), in some possible implementations of the present disclosure, the prediction unit 1303 is further configured to acquire a preset entity set corresponding to the target text information; the prediction unit 1303 is further configured to determine a target category in the preset entity set; and the prediction unit 1303 is further configured to train the BERT based on the target category.

In certain embodiment(s), in some possible implementations of the present disclosure, the recognition unit 1304 is further configured to input the tag prediction sequence into the condition discrimination layer in the target recognition model to acquire constraint conditions in the conditional discriminant layer, the constraint conditions being set based on preset global information; and the recognition unit 1304 is further configured to screen the attribution probability corresponding to each of the subvectors based on the constraint conditions to determine the target items in the set of attribution probabilities.

In certain embodiment(s), in some possible implementations of the present disclosure, the recognition unit 1304 is further configured to determine candidate tags corresponding to the subvectors, the candidate tags including position identifiers and tag identifiers; and the recognition unit 1304 is further configured to screen a corresponding relation between the position identifiers and the tag identifiers based on the constraint conditions to determine the target items in the set of attribution probabilities.

In certain embodiment(s), in some possible implementations of the present disclosure, the prediction unit 1304 is further configured to acquire an initialization transition matrix; the prediction unit 1304 is further configured to train the initialization transition matrix based on global information corresponding to the target text information to obtain a target transition matrix; and the prediction unit 1304 is further configured to determine the constraint conditions according to distribution of transition scores in the target transition matrix.

In certain embodiment(s), in some possible implementations of the present disclosure, the acquisition unit 1301 is further configured to acquire target recognition data in response to a target operation, the target recognition data including at least one media content form; and the acquisition unit 1301 is further configured to textually interpret the target recognition data based on the media content form to determine the target text information.

As can be seen from the above embodiment, for target text information of a to-be-recognized entity, the target text information is inputted into the input representation layer in the target recognition model to generate a target vector sequence. In order to enhance comprehensiveness of description of features of the target text information, the target text information is represented by at least two text dimensions. It is determined that a plurality of subvectors included in the target vector sequence are obtained by representing the target text information based on the at least two text dimensions. The target vector sequence is inputted into the semantic representation layer in the target recognition model to obtain a tag prediction sequence of a set of attribution probabilities of the plurality of subvectors and a plurality of entity tags respectively. The semantic representation layer includes a plurality of recognition nodes that are parallel and correlated with each other, so as to obtain respective context information between the recognition nodes, enhance integrity of semantic representation, and improve accuracy of subsequent recognition of the entity tags. Moreover, since the plurality of entity tags are set based on different categories of entities, the target text information can be correlated with more entity tags during the recognition, important features of the different categories of entities can be screened out, which enhances the capability to distinguish the entity categories. The tag prediction sequence is inputted to the condition discrimination layer in the target recognition model to determine target items, which are used for indicating the entities in the target text information, in the set of attribution probabilities. In this way, an efficient NER process is realized, and efficiency and accuracy of NER are improved.

Figure 14:
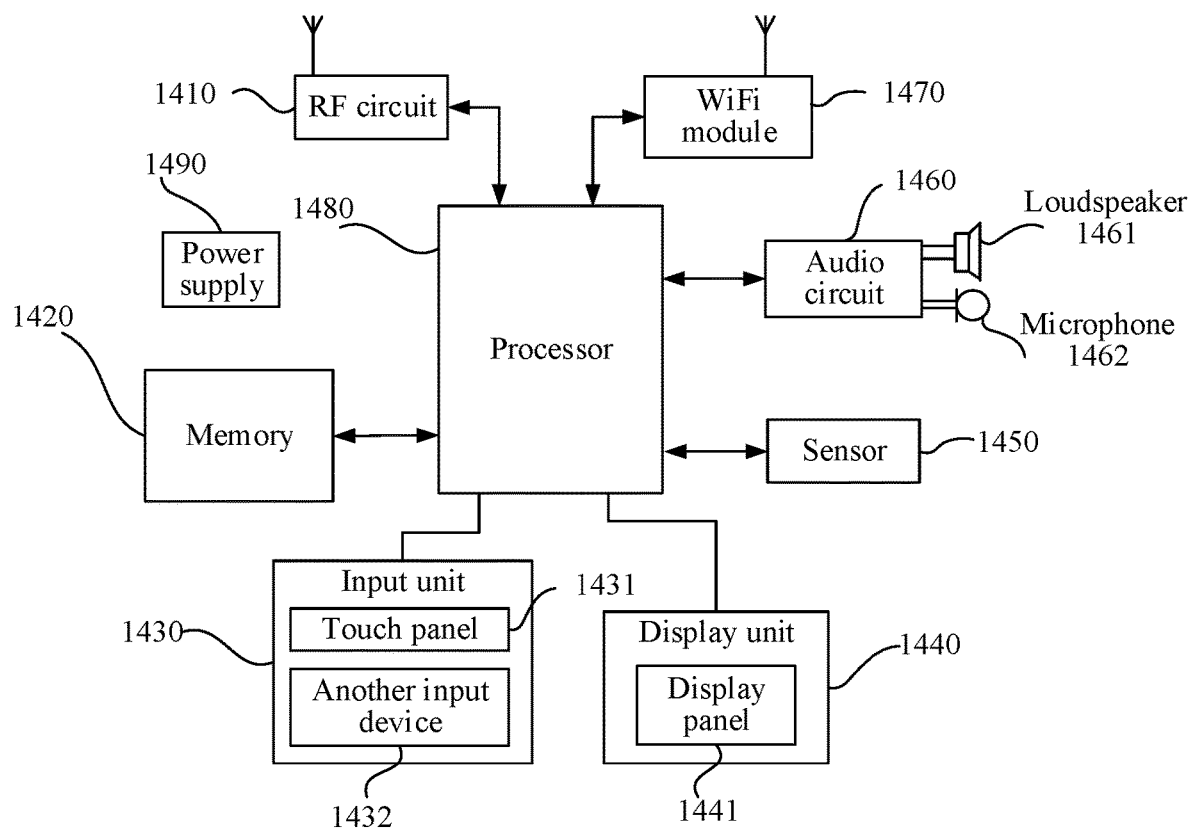
FIG. 14 is a schematic structural diagram of a terminal device according to certain embodiment(s) of the present disclosure.

An embodiment of the present disclosure further provides a terminal device. The terminal device may be the terminal device for implementing the NER method referred to in the embodiment. The NER apparatus according to the embodiment of the present disclosure may be configured in the terminal device. FIG. 14 is a schematic structural diagram of a terminal device according to an embodiment of the present disclosure. For ease of description, only parts related to the embodiments of the present disclosure are shown. For specific technical details that are not disclosed, refer to the method part in the embodiments of the present disclosure. The terminal device may be any terminal device including a mobile phone, a tablet computer, a personal digital assistant (PDA), a point of sales (POS), and an on-board computer, and the terminal device being a mobile phone is used as an example.

FIG. 14 is a block diagram of a structure of a part of a mobile phone related to a terminal according to an embodiment of the present disclosure. Referring to FIG. 14, the mobile phone includes components such as: a radio frequency (RF) circuit 1410, a memory 1420, an input unit 1430, a display unit 1440, a sensor 1450, an audio circuit 1460, a wireless fidelity (Wi-Fi) module 1470, a processor 1480, and a power supply 1490. A person skilled in the art may understand that the structure of the mobile phone shown in FIG. 14 does not constitute a limitation on the mobile phone, and the mobile phone may include more components or fewer components than those shown in the figure, or some components may be combined, or a different component deployment may be used.

The following makes a detailed description of components of the mobile phone with reference to FIG. 14.

The RF circuit 1410 may be configured to receive and transmit signals during an information receiving and transmitting process or a call process. In certain embodiment(s), the RF circuit receives downlink information from a base station, delivers the downlink information to the processor 1480 for processing, and transmits designed uplink data to the base station. Usually, the RF circuit 1410 includes, but is not limited to, an antenna, at least one amplifier, a transceiver, a coupler, a low noise amplifier (LNA), and a duplexer. In addition, the RF circuit 1410 may also communicate with networks and other devices via wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1420 may be configured to store a software program and a module, and the processor 1480 executes various function applications and data processing of the mobile phone by running the software program and the module stored in the memory 1420. The memory 1420 may include a program storage area and a data storage area. The program storage area may store an operating system, an application program desired by at least one function (such as a sound playback function and an image display function), and the like. The data storage area may store data (such as audio data and an address book) created according to the use of the mobile phone, and the like. In addition, the memory 1420 may include a high-speed random access memory, and may also include a nonvolatile memory, for example, at least one magnetic disk storage device, a flash memory, or another volatile solid-state storage device.

The input unit 1430 may be configured to receive input digit or character information, and generate a keyboard signal input related to the user setting and function control of the mobile phone. In certain embodiment(s), the input unit 1430 may include a touch panel 1431 and another input device 1432. The touch panel 1431, which may also be referred to as a touchscreen, may collect a touch operation of a user on or near the touch panel (such as an operation of a user on or near the touch panel 1431, and an air touch operation of the user within a certain range on the touch panel 1431 by using any suitable object or accessory such as a finger or a stylus), and drive a corresponding connection apparatus according to a preset program. In certain embodiment(s), the touch panel 1431 may include a touch detection apparatus and a touch controller.

The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1480. In addition, the touch controller can receive a command transmitted by the processor 1480 and execute the command. In addition, the touch panel 1431 may be implemented by using various types, such as a resistive type, a capacitance type, an infrared type, and a surface acoustic wave type. In addition to the touch panel 1431, the input unit 1430 may further include the another input device 1432. In certain embodiment(s), the another input device 1432 may include, but is not limited to, one or more of a physical keyboard, a functional key (such as a volume control key or a switch key), a track ball, a mouse, and a joystick.

The display unit 1440 may be configured to display information input by the user or information provided for the user, and various menus of the mobile phone. The display unit 1440 may include a display panel 1441. In certain embodiment(s), the display panel 1441 may be configured by using a liquid crystal display (LCD), an organic light-emitting diode (OLED), or the like. Further, the touch panel 1431 may cover the display panel 1441. After detecting a touch operation on or near the touch panel 1431, the touch panel transfers the touch operation to the processor 1480, to determine a type of a touch event. The processor 1480 provides a corresponding visual output on the display panel 1441 according to the type of the touch event. Although in FIG. 14, the touch panel 1431 and the display panel 1441 are used as two separate parts to implement input and output functions of the mobile phone, in some embodiments, the touch panel 1431 and the display panel 1441 may be integrated to implement the input and output functions of the mobile phone.

The mobile phone may further include at least one sensor 1450 such as an optical sensor, a motion sensor, and other sensors. In certain embodiment(s), the optical sensor may include an ambient light sensor and a proximity sensor. The ambient light sensor may adjust luminance of the display panel 1441 according to brightness of the ambient light. The proximity sensor may switch off the display panel 1441 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1460, a speaker 1461, and a microphone 1462 may provide audio interfaces between a user and the mobile phone. The audio circuit 1460 may convert received audio data into an electrical signal and transmit the electrical signal to the speaker 1461. The speaker 1461 converts the electrical signal into a sound signal for output. On the other hand, the microphone 1462 converts a collected sound signal into an electrical signal. The audio circuit 1460 receives the electrical signal, converts the electrical signal into audio data, and outputs the audio data to the processor 1480 for processing. The processor transmits the audio data to, for example, another mobile phone by using the RF circuit 1410, or outputs the audio data to the memory 1420 for further processing.

Wi-Fi belongs to a short distance wireless transmission technology. The mobile phone may help, by using the Wi-Fi module 1470, a user to receive and transmit an email, browse a web page, access stream media, and the like. This provides wireless broadband Internet access for the user. Although FIG. 14 shows the WiFi module 1470, it is to be understood that the WiFi module does not belong to components of the mobile phone and may be omitted as desirable within the scope of not changing the essence of the present invention.

The processor 1480 is a control center of the mobile phone, and is connected to various parts of the entire mobile phone by using various interfaces and lines. By running or executing a software program and/or module stored in the memory 1420, and invoking data stored in the memory 1420, the processor executes various functions of the mobile phone and performs data processing, thereby monitoring the entire mobile phone. In certain embodiment(s), the processor 1480 may include one or more processing units. In certain embodiment(s), the processor 1480 may integrate an application processor and a modem processor. The application processor processes an operating system, a user interface, an application program, and the like. The modem processor processes wireless communication. It may be understood that the modem may not be integrated into the processor 1480.

The mobile phone further includes the power supply 1490 (such as a battery) for supplying power to the components. In certain embodiment(s), the power supply may be logically connected to the processor 1480 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the present disclosure, the processor 1480 included in the terminal device further has functions of performing steps of the entity recognition method.

Figure 15:
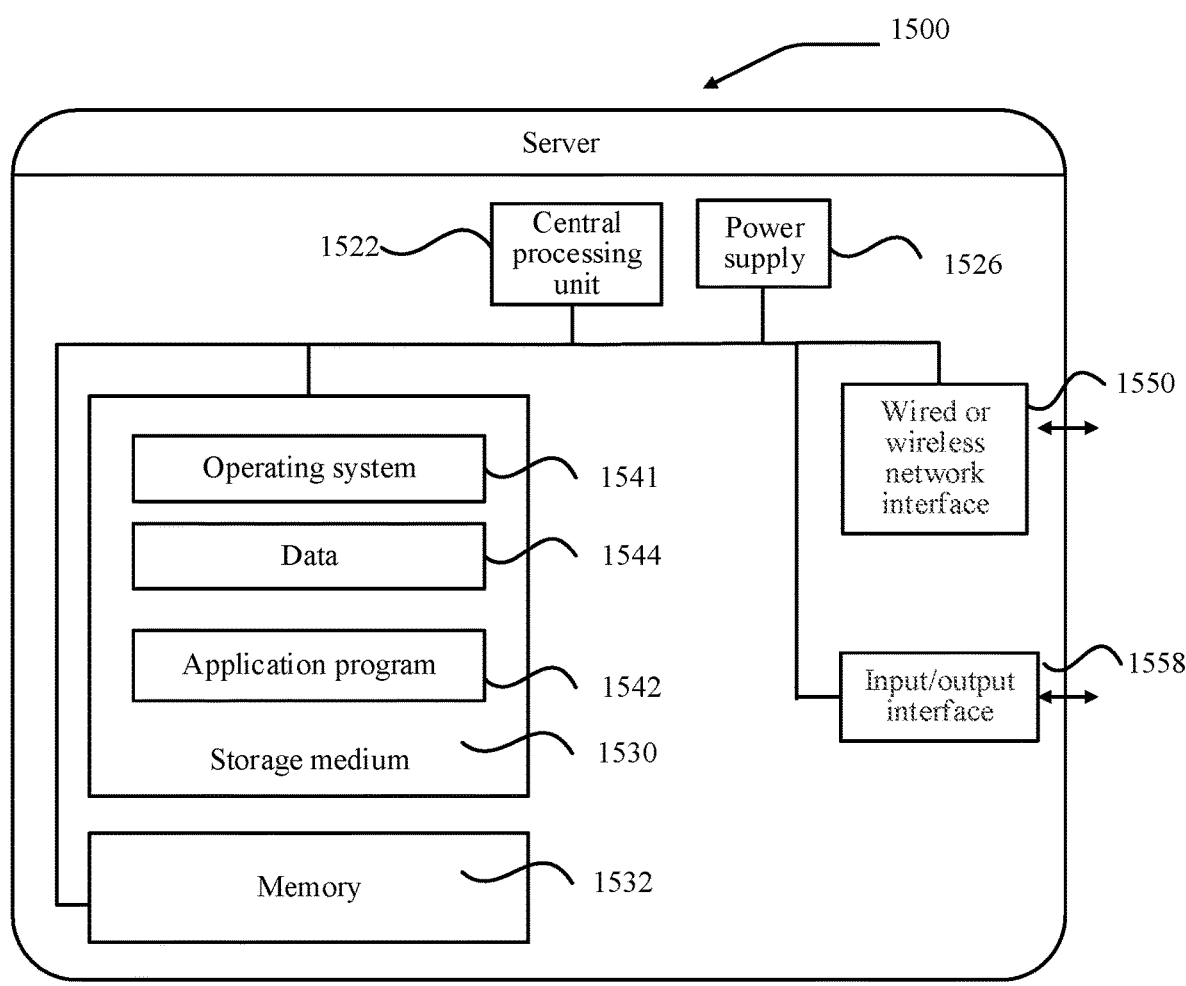
FIG. 15 is a schematic structural diagram of a server according to certain embodiment(s) of the present disclosure.

An embodiment of the present disclosure further provides a server. The server may be the server for implementing the NER method referred to in the embodiment. The NER apparatus according to the embodiment of the present disclosure may be configured in the server. FIG. 15 is a schematic structural diagram of a server according to an embodiment of the present disclosure. The server 1500 may vary greatly due to different configurations or performance, and may include one or more central processing units (CPU) 1522 (for example, one or more processors) and a memory 1532, and one or more storage media 1530 (for example, one or more mass storage devices) that store applications 1542 or data 1544. The memory 1532 and the storage medium 1530 may be transient storage or persistent storage. The program stored in the storage medium 1530 may include one or more modules (not marked in the figure), and each module may include a series of instruction operations to the server. Further, the central processing unit 1522 may be set to communicate with the storage medium 1530, and execute, on the server 1500, the series of instruction operations stored in the storage medium 1530.

The server 1500 may further include one or more power supplies 1526, one or more wired or wireless network interfaces 1550, one or more input/output interfaces 1558, and/or one or more operating systems 1541 such as Windows Server™, Mac OS X™, Unix™, Linux™, and FreeBSD™.

Steps performed by the computing device in the embodiments may be based on the structure of the server shown in FIG. 15.

An embodiment of the present disclosure further provides a computer-readable storage medium, storing a computer program, the computer program being configured to perform the methods provided in the embodiments.

An embodiment of the present disclosure further provides a computer program product including entity recognition instructions, the instructions, when run on a computer, causing the computer to perform the method according to the embodiments.

An embodiment of the present disclosure further provides an NER system. The NER system may include the NER apparatus in the embodiment described in FIG. 13, or the terminal device in the embodiment described in FIG. 14, or the server described in FIG. 15.

A person skilled in the art can clearly understand that for convenience and conciseness of description, for specific working processes of the described system, apparatus and unit, reference can be made to the corresponding processes in the method embodiments, and details are not described herein.

In the several embodiments provided in the present disclosure, it should be understood that the disclosed system, apparatus, and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual desirables to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related technology, or all or some of the technical solutions may be implemented in a form of a software product. The computer software product is stored in a storage medium and includes several instructions for instructing a computing device (which may be a personal computer, an entity recognition apparatus, a network device, or the like) to perform all or some of the steps of the methods described in the embodiments of the present disclosure. The storage medium includes: any medium that can store program code, such as a USB flash drive, a removable hard disk, a ROM (read only memory, ROM), a RAM (random access memory, RAM), a magnetic disk, or an optical disc.

The embodiments are merely intended for describing the technical solutions of the present disclosure, but not for limiting the present disclosure. Although the present disclosure is described in detail with reference to the embodiments, a person of ordinary skill in the art should understand that they may still make modifications to the technical solutions described in the embodiments or make equivalent replacements to some technical features thereof, without departing from the spirit and scope of the technical solutions of the embodiments of the present disclosure.

What is claimed is:

1. A named entity recognition (NER) method, performed by a computing device, the method comprising:
   acquiring target text information;
   inputting the target text information into an input representation layer in a target recognition model to generate a target vector sequence, the target vector sequence including a plurality of subvectors, the plurality of subvectors being obtained by representing the target text information based on at least three text dimensions including a word dimension, a term dimension, and a part of speech dimension;
   inputting the target vector sequence into a semantic representation layer in the target recognition model to obtain a tag prediction sequence, the tag prediction sequence being a set of attribution probabilities of the plurality of subvectors and a plurality of entity tags, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and
   inputting the tag prediction sequence into a condition discrimination layer in the target recognition model to determine target items in the set of attribution probabilities, the target items being used for indicating the entities in the target text information,
   wherein the semantic representation layer includes a bidirectional encoder representation from transformers (BERT) and a bi-directional long short-term memory (BiLSTM) model, and inputting the target vector sequence comprises:
  inputting the target vector sequence into the BERT to obtain a first semantic representation;
  inputting the target vector sequence into the BiLSTM model to obtain a second semantic representation;
  splicing the first semantic representation and the second semantic representation to obtain a target semantic representation; and
  matching the plurality of entity tags based on the target semantic representation to obtain the tag prediction sequence,
wherein the inputting the tag prediction sequence comprises: inputting the tag prediction sequence into the condition discrimination layer in the target recognition model to acquire constraint conditions in the conditional discriminant layer, the constraint conditions being set based on preset global information; and screening the attribution probability corresponding to each of the subvectors based on the constraint conditions to determine the target items in the set of attribution probabilities, wherein the method further comprises: acquiring an initialization transition matrix; training the initialization transition matrix based on the preset global information corresponding to the target text information to obtain a target transition matrix; and determining the constraint conditions according to distribution of transition scores in the target transition matrix, such that the screening of the attribution probability accounts for influence of one or more neighboring tags on a current tag.

2. The method of claim 1, wherein inputting the target text information comprises:
  inputting the target text information into the input representation layer in the target recognition model for term embedding to obtain a term embedding vector;
  performing word embedding on the target text information to obtain a word embedding vector; and
  generating the target vector sequence by taking the term embedding vector and the word embedding vector as the subvectors.

3. The method of claim 1, wherein inputting the target vector sequence comprises:
  inputting the target vector sequence into the BERT to obtain a first semantic representation;
  inputting the first semantic representation into the BiLSTM model to obtain a target semantic representation; and
  matching the plurality of entity tags based on the target semantic representation to obtain the tag prediction sequence.

4. The method of claim 3, wherein inputting the first semantic representation comprises:
  inputting the first semantic representation into the BiLSTM model for first order-based computation to obtain upper information;
  inputting the first semantic representation into the BiLSTM model for second order-based computation to obtain lower information; and
  performing splicing based on the upper information and the lower information to obtain the target semantic representation.

5. The method of claim 3, further comprising:
  acquiring a text size corresponding to the target text information; and
  determining, based on the text size, a manner in which the target vector sequence is inputted into the BERT and the BiLSTM model.

6. The method of claim 3, further comprising:
  acquiring a preset entity set corresponding to the target text information;
  determining a target category in the preset entity set; and
  training the BERT based on the target category.

7. The method of claim 1, wherein screening the attribution probability comprises:
  determining candidate tags corresponding to the subvectors, the candidate tags comprising position identifiers and tag identifiers; and
  screening a corresponding relation between the position identifiers and the tag identifiers based on the constraint conditions to determine the target items in the set of attribution probabilities.

8. The method of claim 1, wherein acquiring the target text information comprises:
  acquiring target recognition data in response to a target operation, the target recognition data comprising at least one media content form; and
  textually interpreting the target recognition data based on the media content form to determine the target text information.

9. A named entity recognition (NER) apparatus, comprising: a memory storing computer program instructions; and a processor coupled to the memory and configured to execute the computer program instructions and perform:
  acquiring target text information;
  inputting the target text information into an input representation layer in a target recognition model to generate a target vector sequence, the target vector sequence including a plurality of subvectors, the plurality of subvectors being obtained by representing the target text information based on at least three text dimensions including a word dimension, a term dimension, and a part of speech dimension;
  inputting the target vector sequence into a semantic representation layer in the target recognition model to obtain a tag prediction sequence, the tag prediction sequence being a set of attribution probabilities of the plurality of subvectors and a plurality of entity tags, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and
  inputting the tag prediction sequence into a condition discrimination layer in the target recognition model to determine target items in the set of attribution probabilities, the target items being used for indicating the entities in the target text information, wherein the semantic representation layer includes a bidirectional encoder representation from transformers (BERT) and a bi-directional long short-term memory (BiLSTM) model, and inputting the target vector sequence includes:
    inputting the target vector sequence into the BERT to obtain a first semantic representation;
    inputting the target vector sequence into the BiLSTM model to obtain a second semantic representation;
    splicing the first semantic representation and the second semantic representation to obtain a target semantic representation; and
    matching the plurality of entity tags based on the target semantic representation to obtain the tag prediction sequence, wherein the inputting the tag prediction sequence includes: inputting the tag prediction sequence into the condition discrimination layer in the target recognition model to acquire constraint conditions in the conditional discriminant layer, the constraint conditions being set based on preset global information; and screening the attribution probability corresponding to each of the subvectors based on the constraint conditions to determine the target items in the set of attribution probabilities, wherein the processor is further configured to execute the computer program instructions and perform: acquiring an initialization transition matrix; training the initialization transition matrix based on the preset global information corresponding to the target text information to obtain a target transition matrix; and determining the constraint conditions according to distribution of transition scores in the target transition matrix, such that the screening of the attribution probability accounts for influence of one or more neighboring tags on a current tag.

10. The named entity recognition (NER) apparatus of claim 9, wherein inputting the target text information includes:
 inputting the target text information into the input representation layer in the target recognition model for term embedding to obtain a term embedding vector;
 performing word embedding on the target text information to obtain a word embedding vector; and
 generating the target vector sequence by taking the term embedding vector and the word embedding vector as the subvectors.

11. The named entity recognition (NER) apparatus of claim 9, wherein inputting the target vector sequence includes:
 inputting the target vector sequence into the BERT to obtain a first semantic representation;
 inputting the first semantic representation into the BiLSTM model to obtain a target semantic representation; and
 matching the plurality of entity tags based on the target semantic representation to obtain the tag prediction sequence.

12. The named entity recognition (NER) apparatus of claim 11, wherein inputting the first semantic representation includes:
 inputting the first semantic representation into the BiLSTM model for first order-based computation to obtain upper information;
 inputting the first semantic representation into the BiLSTM model for second order-based computation to obtain lower information; and
 performing splicing based on the upper information and the lower information to obtain the target semantic representation.

13. The named entity recognition (NER) apparatus of claim 11, wherein the processor is further configured to execute the computer program instructions and perform:
 acquiring a text size corresponding to the target text information; and
 determining, based on the text size, a manner in which the target vector sequence is inputted into the BERT and the BiLSTM model.

14. The named entity recognition (NER) apparatus of claim 11, wherein the processor is further configured to execute the computer program instructions and perform:
 acquiring a preset entity set corresponding to the target text information;
 determining a target category in the preset entity set; and
 training the BERT based on the target category.

15. A non-transitory computer-readable storage medium storing computer program instructions executable by at least one processor to perform:
 acquiring target text information;
 inputting the target text information into an input representation layer in a target recognition model to generate a target vector sequence, the target vector sequence including a plurality of subvectors, the plurality of subvectors being obtained by representing the target text information based on at least three text dimensions including a word dimension, a term dimension, and a part of speech dimension;
 inputting the target vector sequence into a semantic representation layer in the target recognition model to obtain a tag prediction sequence, the tag prediction sequence being a set of attribution probabilities of the plurality of subvectors and a plurality of entity tags, the semantic representation layer including a plurality of parallel recognition nodes, the recognition nodes being correlated with each other, the recognition nodes being configured to recognize the attribution probabilities of the corresponding subvectors and the plurality of entity tags, the plurality of entity tags being set based on different categories of entities; and
 inputting the tag prediction sequence into a condition discrimination layer in the target recognition model to determine target items in the set of attribution probabilities, the target items being used for indicating the entities in the target text information, wherein the semantic representation layer includes a bidirectional encoder representation from transformers (BERT) and a bi-directional long short-term memory (BiLSTM) model, and inputting the target vector sequence includes:
  inputting the target vector sequence into the BERT to obtain a first semantic representation;
  inputting the target vector sequence into the BiLSTM model to obtain a second semantic representation;
  splicing the first semantic representation and the second semantic representation to obtain a target semantic representation; and
  matching the plurality of entity tags based on the target semantic representation to obtain the tag prediction sequence,
wherein the inputting the tag prediction sequence includes: inputting the tag prediction sequence into the condition discrimination layer in the target recognition model to acquire constraint conditions in the conditional discriminant layer, the constraint conditions being set based on preset global information; and screening the attribution probability corresponding to each of the subvectors based on the constraint conditions to determine the target items in the set of attribution probabilities, wherein the computer program instructions are further executable by the at least one processor to perform: acquiring an initialization transition matrix; training the initialization transition matrix based on the preset global information corresponding to the target text information to obtain a target transition matrix; and determining the constraint conditions according to distribution of transition scores in the target transition matrix, such that the screening of the attribution probability accounts for influence of one or more neighboring tags on a current tag.

* * * * *